United States Patent
Dillon et al.

(10) Patent No.: US 7,599,071 B2
(45) Date of Patent: Oct. 6, 2009

(54) DETERMINING POSITIONAL ERROR OF AN OPTICAL COMPONENT USING STRUCTURED LIGHT PATTERNS

(75) Inventors: Robert F. Dillon, Chelmsford, MA (US); Roy D. Allen, North Andover, MA (US); Neil Judell, Newtonville, MA (US); Yi Qian, Acton, MA (US)

(73) Assignee: Dimensional Photonics International, Inc., Wilmington, MA (US)

(*) Notice: Subject to any disclaimer, the term of this patent is extended or adjusted under 35 U.S.C. 154(b) by 0 days.

(21) Appl. No.: 11/910,646

(22) PCT Filed: Apr. 4, 2006

(86) PCT No.: PCT/US2006/012440
§ 371 (c)(1),
(2), (4) Date: Oct. 4, 2007

(87) PCT Pub. No.: WO2006/107929
PCT Pub. Date: Oct. 12, 2006

(65) Prior Publication Data
US 2008/0180693 A1    Jul. 31, 2008

Related U.S. Application Data

(60) Provisional application No. 60/669,039, filed on Apr. 6, 2005.

(51) Int. Cl.
*G01B 9/02* (2006.01)
*G01B 11/02* (2006.01)

(52) U.S. Cl. ...................... 356/521; 356/499
(58) Field of Classification Search ............... 356/496, 356/499, 521
See application file for complete search history.

(56) References Cited

U.S. PATENT DOCUMENTS

| | | | |
|---|---|---|---|
| 4,329,059 A | 5/1982 | Pond et al. | |
| 5,636,025 A | 6/1997 | Bieman et al. | |
| 5,811,826 A | 9/1998 | Shirley | |
| 5,870,191 A | 2/1999 | Shirley et al. | |
| 5,880,839 A * | 3/1999 | Ishizuka et al. | 356/499 |
| 5,900,936 A | 5/1999 | Shirley et al. | |
| 6,031,612 A | 2/2000 | Shirley | |
| 6,088,103 A | 7/2000 | Everett et al. | |

(Continued)

OTHER PUBLICATIONS

PCT/US2006/012440 International Search Report and Written Opinion dated Sep. 7, 2006, 9 pages.

*Primary Examiner*—Michael A Lyons
(74) *Attorney, Agent, or Firm*—Guerin & Rodriguez, LLP

(57) ABSTRACT

Described is an interferometric surface contour measurement system for projecting structured light patterns onto an object. The measurement system includes an interferometric projector, an imager, and a processor. The imager is rigidly coupled to the projector to maintain a stable relationship to the projected, structured light pattern. The imager receives the structured light pattern and together with the processor, determines whether the projected image includes a positional error. In some embodiments, the projector is a multi-channel projector, each channel having an optical axis spatially separated from the others, one of the channels including the imager and dedicated for determining positional error. In other embodiments, the projector is a single-channel projector projecting a structured light pattern onto the object, a portion of the structured light pattern being tapped-off for determining positional error.

17 Claims, 17 Drawing Sheets

U.S. PATENT DOCUMENTS

| | | |
|---|---|---|
| 6,690,474 B1 | 2/2004 | Shirley |
| 6,952,270 B2 | 10/2005 | Shirley |
| 7,034,948 B2 * | 4/2006 | Tamiya et al. ............... 356/499 |
| 7,184,149 B2 | 2/2007 | Swanson et al. |
| 7,242,484 B2 | 7/2007 | Shirley |
| 2001/0015808 A1 * | 8/2001 | Akihiro .................... 356/499 |

* cited by examiner

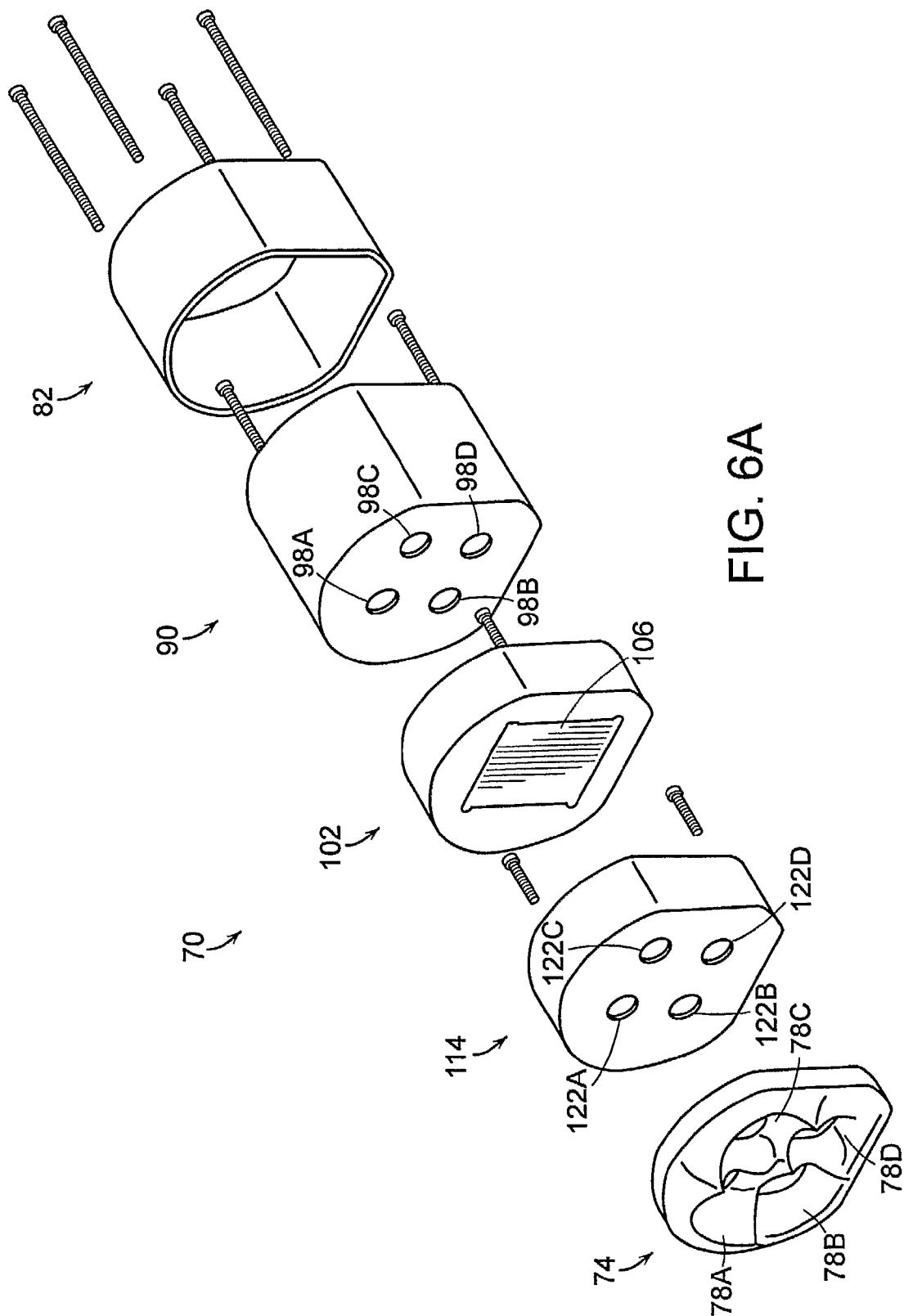

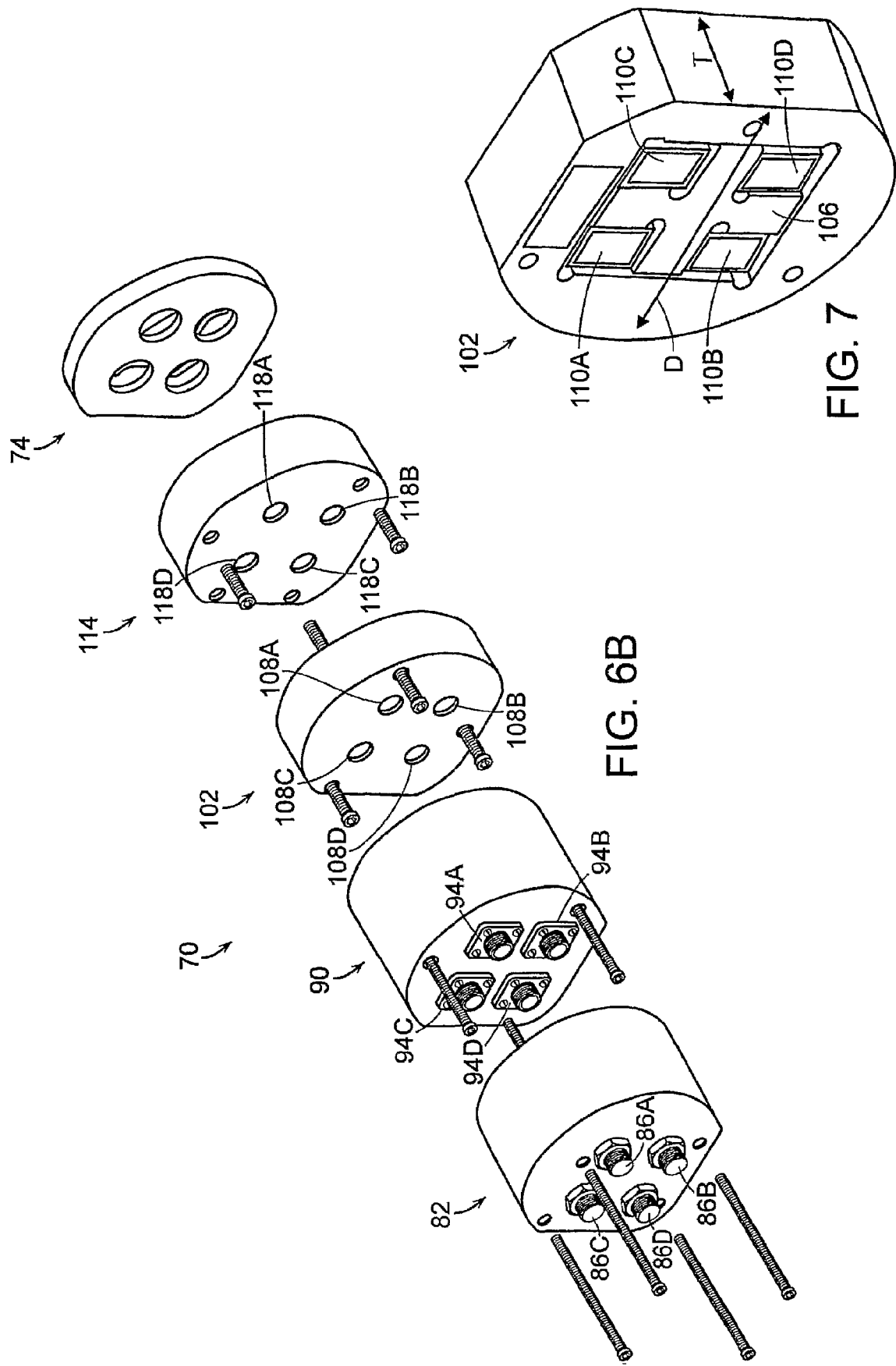

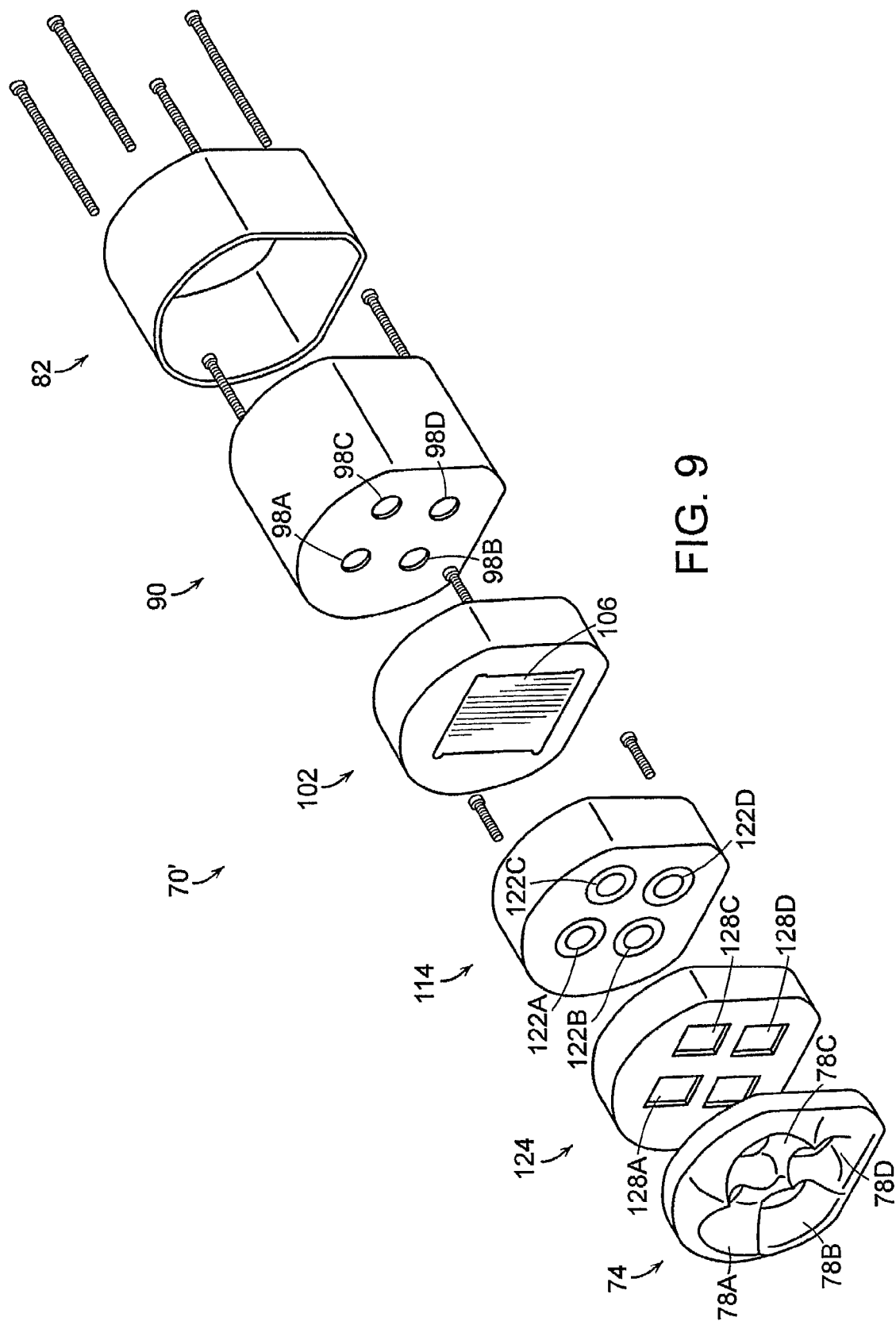

DETERMINING POSITIONAL ERROR OF AN OPTICAL COMPONENT USING STRUCTURED LIGHT PATTERNS

RELATED APPLICATIONS

This application claims the benefit of the earlier filing date of U.S. Provisional Patent Application Ser. No. 60/669,039, filed Apr. 6, 2005, titled "Multiple Channel Interferometric Surface Contour Measurement Methods and Apparatus," the entirety of which is incorporated herein by reference.

FIELD OF THE INVENTION

The invention relates generally to the measurement of surface contours and more particularly to an imaging system for detecting positional errors in a structured light pattern used in obtaining the surface contour measurements.

BACKGROUND OF THE INVENTION

Surface measurement systems are used in a variety of applications to generate three dimensional surface data of objects. Such systems are employed at various stages in the fabrication and assembly of complex objects across a variety of industries to ensure that the shape and size of the objects meet strict manufacturing tolerances.

Interferometric surface measurement systems have been developed which permit measurements of the surface of an object without physical contact. Coherent optical sources are used to generate a fringe pattern on the surface of the object and a camera acquires images of the fringes on the surface for analysis. In some systems, a diffraction grating is positioned in the path of a laser beam to generate multiple coherent laser beams at various angles to the original beam path. A focusing objective and spatial filter are used to isolate the desired diffracted beam pair. One or more additional diffraction gratings are utilized to project at least one additional set of fringes onto the object surface. This multiplexing of different gratings into the beam path poses many challenges. Moving different gratings into the beam path and shifting each grating to implement phase shifts generally requires multiple mechanical components that add weight, size, complexity and cost to the system. The frequent movement of components affects the stability and therefore the accuracy of the measurement data. Moreover, measuring the displacement of a diffraction grating during the phase shift process with sufficient precision and accuracy can require expensive measurement components such as capacitance gauges.

Even when precision components, such as the capacitance gauges are used, their accuracy often degrades over time. Structural changes in the interconnecting cables and the dielectric material introduce errors into the measurements. Because the positional accuracy required for the surface measurement system may be on the order of 20-30 nanometers, even the slightest of structural changes can introduce intolerable error.

SUMMARY OF THE INVENTION

The invention provides a dedicated imager positioned to receive a projected fringe pattern. The imager is rigidly secured with respect to the projected fringe pattern, and adapted to detect positional errors on the order of the measurement accuracy.

In one aspect, the invention features multiple channel interferometer projector for projecting fringes onto a surface of an object. The multiple-channel projector includes multiple interferometer channels, each channel having a spatially separate optical axis. At least one of the channels is adapted to project a respective fringe pattern onto the surface of an object. The projector also includes multiple diffraction gratings, one diffraction grating disposed along the each of the separate optical axes and a positioning stage coupled to the diffraction gratings. The positioning stage positions the multiple diffraction gratings in a plane perpendicular to the optical axis. An imager is substantially fixed in position relative to the diffraction gratings. The imager receives at least a portion of one of the projected fringe patterns and generates image data responsive thereto. The projector also includes a processor in communication with the imager and the positioning stage, the processor receiving the image data and in response thereto, determining a position of the gratings. The positioning stage repositions the multiple diffraction gratings in response to a difference between the determined position and a measured position.

In another aspect, the invention features a multiple channel interferometer projector for projecting fringes onto a surface of an object including multiple interferometer channels, each channel having a spatially separate optical axis. At least one of the interferometer channels is adapted to project a respective fringe pattern onto the surface of an object. A spatial attenuator is positioned along one of the spatially separate optical axes to attenuate the respective projected fringe pattern. A detector receives a portion of the attenuated projected fringe pattern and generates image data responsive thereto. The projector also includes a processor in communication with the detector for receiving the image data and, in response thereto, determining a positional error of the respective fringe pattern.

In yet another aspect, the invention features a method for determining an offset value associated with a diffraction grating. The method includes positioning a diffraction grating at a known reference position and projecting a fringe pattern of a spatial frequency along an optical axis, the projected fringe pattern generated using the positioned diffraction grating. At least a portion of the projected fringe pattern is detected, and a position value of the detected fringe pattern is determined therefrom. The determined position value is compared to a measured position of the diffraction grating, the comparison is indicative of a positional error of the diffraction grating measurement.

In still another aspect, the invention features an interferometer projector for projecting fringes onto a surface of an object including a diffraction grating disposed along the optical axis. A positioning stage is coupled to the diffraction grating and adapted for positioning of the diffraction grating in a plane perpendicular to the optical axis. An imager, substantially fixed in positioned relative to the diffraction grating, collects a sample of the projected fringe pattern and generates image data responsive thereto. A spatial filter selectively directs an ordered pair of diffracted beams to the imager. A processor in communication with both the imager and the positioning stage receives the image data. The processor determines a positional error and forwards the positional error to the positioning stage, which, in response, repositions the diffraction grating.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

FIG. 6A and FIG. 6B illustrate exploded perspective views of the projector shown in FIG. 5A and FIG. 5B, respectively.

FIG. 7 shows a perspective view of a diffraction grating module of the projector of FIG. 6A and FIG. 6B according to an embodiment of the invention.

FIG. 9 illustrates an exploded perspective view of a multiple channel interferometer projector having an intensity shaping module according to another embodiment of the invention.

DETAILED DESCRIPTION

In brief overview, the present invention relates to a multiple channel interferometric surface contour measurement system. The measurement system includes a multiple channel interferometer projector, a digital camera and a processor. The projector includes two or more interferometer channels and each interferometer channel has an optical axis spatially separate from the optical axes of the other channels. Each channel projects a fringe pattern onto the surface of an object to be measured. As used herein, a digital camera means an electronic imaging device or system that provides digital image data indicative of intensity as a function of image position. The digital camera acquires image data of the fringe patterns projected on the object surface. The processor communicates with the multiple channel interferometer projector and the digital camera. Signal sent from the processor to the projector control the projection of the fringe patterns of different spatial frequencies and the phase of each fringe pattern. The processor generates surface contour data in response to the camera image data. The multiple channel interferometric surface contour measurement system provides numerous advantages over conventional single channel interferometric systems, including reduced sensitivity to optical noise, improved stability and increased measurement accuracy.

Figure 1:
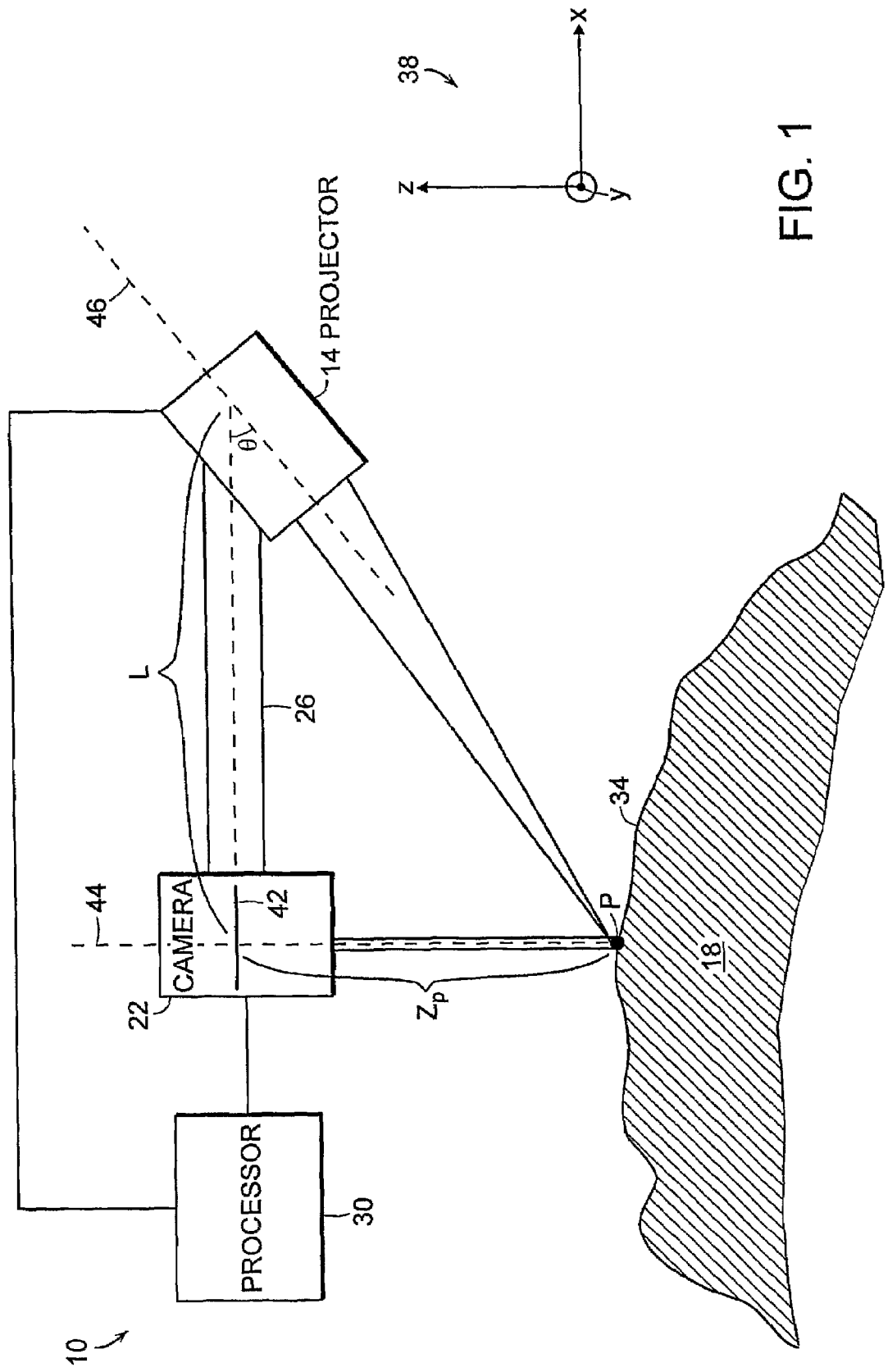
FIG. 1 is a diagram of a surface contour measurement system in which the surface of an object is irradiated with structured light patterns generated according to interferometric principles.

FIG. 1 is an illustration of a surface measurement system 10 in which a projector 14 irradiates a surface of an object of interest 18 with structured light patterns that are generated based on interferometric principles. Images of the irradiated object surface 34 are acquired by a digital camera 22 that is rigidly coupled to the projector 14 via a crossbar 26. The camera 22 is electronically coupled to a processor 30 which is configured to process the acquired images. The processor 30 can be coupled to the projector 14 to control various aspects of the structured light patterns.

The surface measurement system 10 is configured to determine a three-dimensional profile of the surface contour 34. In particular, for a given portion of the surface contour 34 that is within a field of view of the digital camera 22, the processor 30 calculates relative coordinates in three dimensional space for a significant number of points on the object surface 34.

A coordinate system 38 is shown in FIG. 1 to provide a reference for the surface contour measurements. The y-axis of the coordinate system 38 is perpendicular to the plane of the figure. An image plane 42 (e.g., a detector array) of the digital camera 22 lies in an x-y plane in space, and the optical axis 44 of the camera 22 (which is perpendicular to the image plane 42) is parallel to the z-axis of the coordinate system 38. The x-y coordinates of a point P in the camera field of view generally are directly determinable from the known geometry and optical parameters of the camera 22; however, a z-coordinate $z_P$ of the point P is not directly determinable.

Structured light patterns are used to calculate the z-coordinates of points on the object surface 34. Images of structured light patterns irradiating the object surface 34 provide information from which the processor 30 can calculate distances $z_P$ between points P on the object surface and the camera image plane 42. Such calculations are based on triangulation, using a known distance L between the digital camera 22 and the projector 14, and a known angle θ between a central axis 46 of the projector 14 and an axis of the crossbar 26.

In various implementations of the projector 14, light from a coherent light source (e.g., a laser) is separated into two beams. The two beams are directed toward the object surface 34 and caused to interfere with each other so as to generate a pattern of interference fringes comprising periodic bright lines separated by dark lines. As used herein, the process of separating light from a coherent light source into two beams and causing the two beams to interfere to generate a fringe pattern is referred to as "single channel interferometry."

Figure 2:
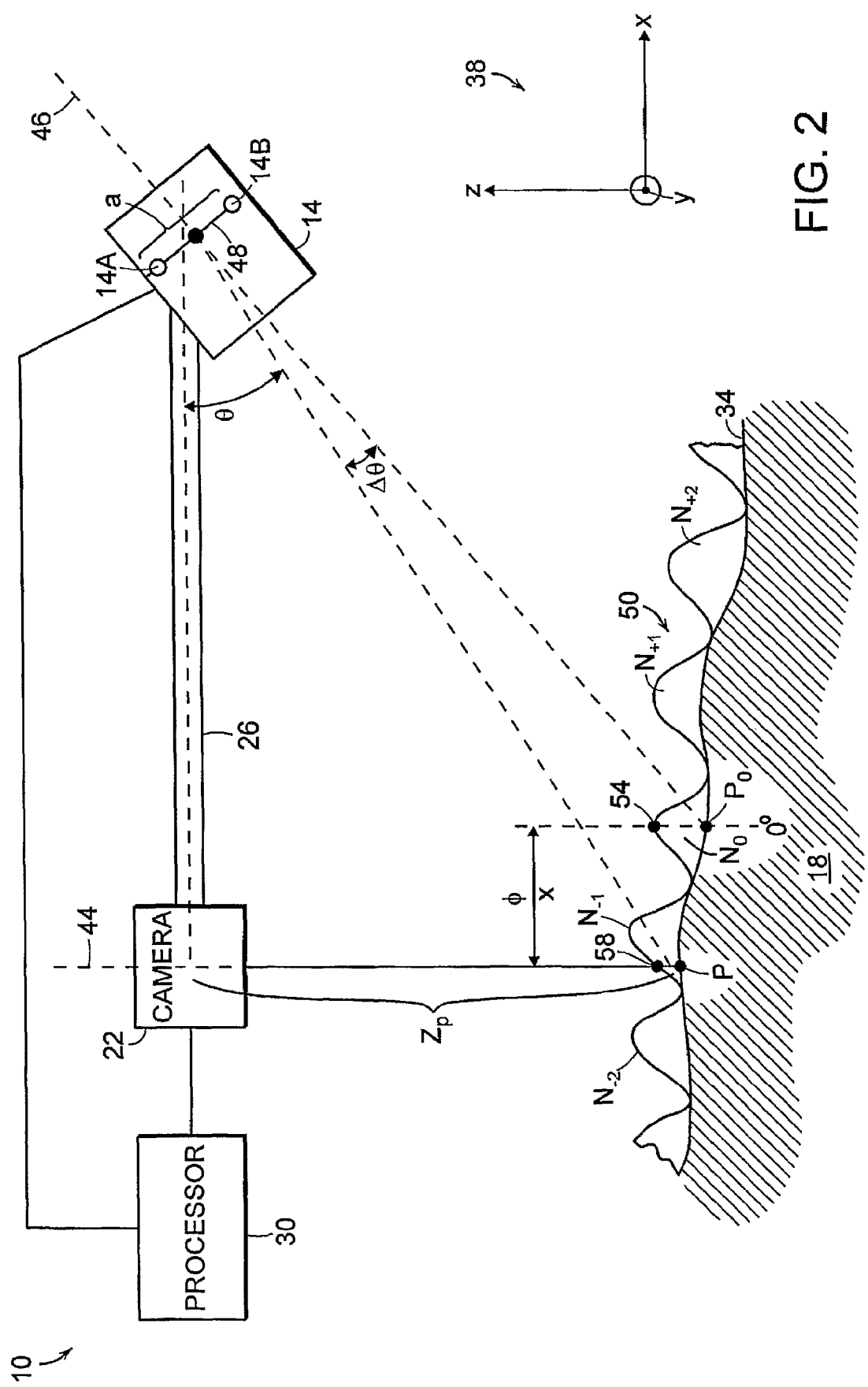
FIG. 2 is another view of the system of FIG. 1 and includes a magnified view of a surface contour of the object.

FIG. 2 is an illustration of the surface measurement system 10 of FIG. 1 and includes a magnified view of the surface contour 34 of the object of interest 18 around a point of interest P for which the distance $z_P$ is to be determined. The projector 14 is configured to irradiate the object surface 34 with a fringe pattern 50 depicted as a periodic wave. The peaks of the periodic wave represent the highest intensities and the troughs of the periodic wave represent the lowest intensities. Thus the areas around the peaks represent bright lines or "fringes" on the object surface 34 that can be observed by the digital camera 22 and the areas around the troughs represent dark lines between neighboring fringes.

The spatial frequency (i.e., periodicity) of the fringe pattern 50 generally is a function of the configuration of the projector 14 and the arrangement of two coherent light sources 14A and 14B or, equivalently, the apparent sources of two spatially distinct beams from a single coherent light source, that interfere with each other. The sources 14A and 14B are separated by a distance a (hereafter the "source separation distance") along an axis 48 perpendicular to the central axis 46 of the projector 14. The spatial frequency of the fringe pattern 50 is determined in part by the source separation distance a. The spatial frequency decreases (i.e., the fringes become "coarser") as the source separation distance a decreases.

In one example, a single channel interferometer projector transmits a laser beam through a diffraction grating having a pitch d (i.e., the spacing between adjacent light perturbing components of the diffraction grating). The laser beam is divided into pairs of coherent beams propagating at various deflection angles from the grating according to their order and the pitch d of the grating. A portion of the laser beam passes through the diffraction grating undeflected as a zero order beam. As the pitch d increases (i.e., as the grating becomes coarser), the deflection angles of the non-zero order beams decrease.

The single channel interferometer utilizes a focusing objective and a spatial filter to isolate the pair of first order beams propagating from the diffraction grating and thereby provide two coherent beams required for interference. Specifically, the focusing objective directs the two first order beams towards two apertures spaced apart at the source separation distance a in the spatial filter. This source separation distance a is determined from the known angles at which the first order beams exit the diffraction grating and the optical properties of the focusing objective. Accordingly, the spatial frequency of the fringe pattern 50 generated by the single channel interferometer is based on the diffraction grating pitch d.

The fringe pattern 50 includes a central fringe having a fringe number $N_o$ and an intensity peak 54, and is associated with a point $P_o$ on the object surface 34 which is intersected by the central axis 46 of the projector 14. As illustrated, the coherent light sources 14A and 14B are disposed symmetrically about the central axis 46. The peak 54 of the central fringe $N_o$ serves as a reference point for the fringe pattern 50, on either side of which are other fringes consecutively labeled $N_{+1}$, $N_{+2}$, ... moving to the right in the figure and $N_{-1}$, $N_{-2}$, ... moving to the left in the figure. Accordingly, the peak 54 of the central fringe $N_o$ is associated with a reference phase of 0° for the fringe pattern 50 and the phase between adjacent peaks, or adjacent troughs, is 360° or $2\pi$ radians.

The determination of the distance $z_P$ between the camera 22 and a point of interest P can be determined from the phase $\phi$ between point $P_0$ at the intensity peak 54 and point P at an intensity 58 on the fringe $N_{-1}$. By determining the phase $\phi$, the angle $\Delta\theta$ can be derived and triangulation calculations can be performed based on the angle $\theta-\Delta\theta$ to determine the distance $z_P$. More specifically, if a rational quantity N represents the total integer and fractional number of fringes between the points P and $P_0$, the corresponding phase $\phi$ is given as $\phi=2\pi N$. The quantity N, hereafter referred to as the "fringe number," is given by $$N = \left(\frac{a}{\lambda}\right)\left(\frac{x}{R}\right),$$

where a is the source separation distance described above, $\lambda$ is the optical wavelength of the sources 14A and 14B, x is the physical distance along the x-axis between the points P and $P_o$, and R is the physical distance between the projector 14 and the point $P_o$ as measured along the central axis 46 of the projector 14 from the midpoint of the sources 14A and 14B and the point $P_o$. The equation above is generally valid provided that the source separation distance a and the distance x are relatively small compared to the distance R. Since the parameters a and $\lambda$ are known a priori, observing the phase $\phi$ in terms of the fringe number N from the acquired images of the fringe pattern 50 provides information relating to the parameters x and R which relate to the angle $\Delta\theta$ and allow a determination of the distance $z_P$ by triangulation.

The accuracy with which the distance $z_P$ can be determined is related in part to the spatial frequency of the fringe pattern 50. Profile changes in the surface contour 34 along the z direction correspond to changes in observed intensity of the fringe pattern 50. The resolution of the surface contour measurement increases as the change in intensity for a given change in distance along the z direction increases. Stated differently, as the slope of the individual fringes of the fringe pattern 50 increases, more accurate measurements of the distance $z_P$ can be made. This situation corresponds to "finer" fringes or, equivalently, an increased spatial frequency of the fringe pattern 50 on the object surface 34.

Although the interferometric fringe pattern 50 has an infinite field of focus relative to the projector 14, images of the projected fringe pattern 50 are limited by practical constraints. For example, imaging a fine fringe pattern over a large range in the z direction requires an imaging system having a large depth of focus and high spatial resolution. These requirements are generally difficult to achieve simultaneously and a particular application typically requires a tradeoff between the two parameters. Accordingly, in some projector implementations, the grating pitch d and the source separation distance a for a given single channel interferometer are selected based, at least in part, on a compromise between high measurement resolution and camera depth of field.

Figure 3:
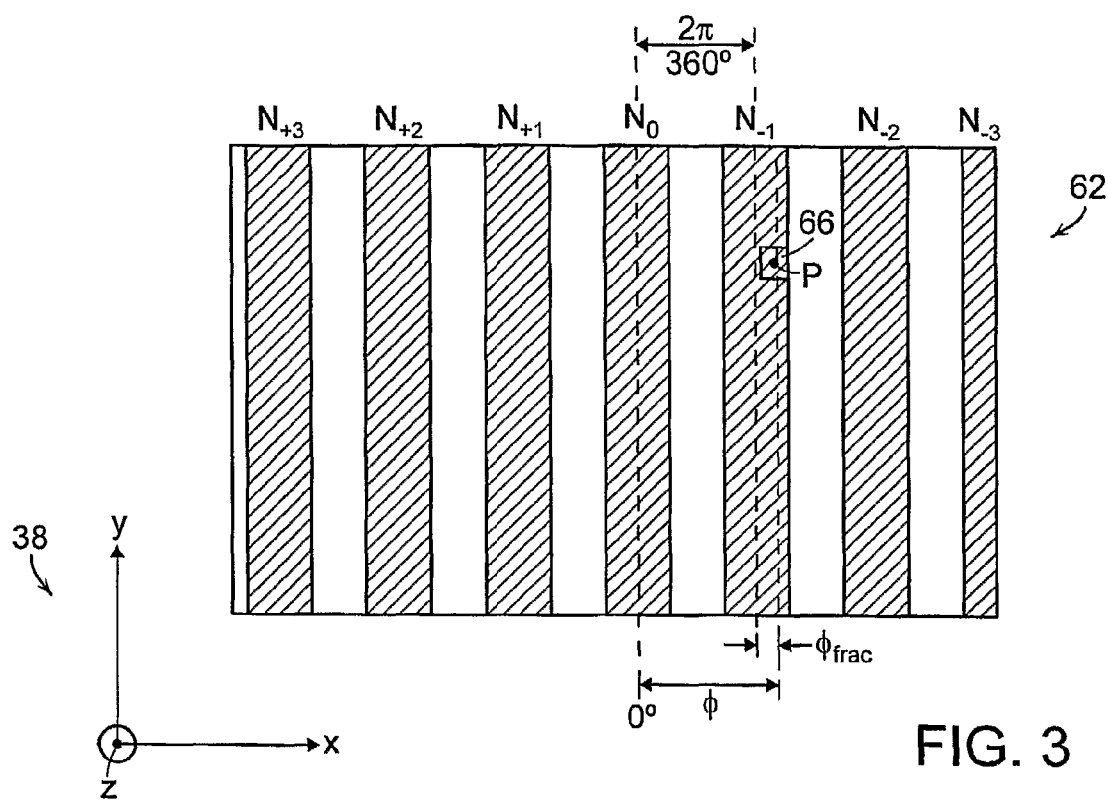
FIG. 3 depicts a portion of an image of the surface of the object of FIG. 2 as irradiated by a first fringe pattern.

FIG. 3 depicts an image 62 of the object surface acquired by the digital camera. Image data is obtained using a two-dimensional matrix of pixels in the camera image plane. Each pixel is associated with an intensity value I based on the light scattered from the object surface and incident on the pixel. One such pixel 66 is shown as containing the point of interest P. The image 62 includes the alternating bright and dark lines of the fringe pattern in which the fringes are indicated with shading and are marked for reference with the designations $N_{+3}$ to $N_{-3}$ moving from left to right in the figure. It should be appreciated that the intensity values of pixels in a row of the image 62 reveal the continuous wave nature of the fringe pattern 50 shown in FIG. 2.

By analyzing the image 62 using the intensity I detected at the pixel 66 to determine the phase φ at he point P, the distance $z_P$ to the point P can be calculated. Additionally, the x and y coordinates of the point P can be determined from knowledge of the geometry and optical properties of the camera. Performing the analysis and three-dimensional coordinate calculation for each pixel in the image 62 allows a detailed profile, or map, of the object surface to be determined.

The phase φ is calculated by (i) determining the "fractional phase" $φ_{frac}$ of the intensity detected for the point P relative to its nearest maximum intensity peak, that is, the center of the fringe $N_{-1}$ and (ii) identifying in the image 62 the location of the zero degree reference phase corresponding to the intensity peak 54 in FIG. 2 so as to determine the portion of the total phase φ that corresponds to an integer number of fringe peaks. A known phase shift technique can be utilized to determine the fractional phase $φ_{frac}$. Referring again to FIG. 2, the projector 14 is configured so that the fringe pattern 50 can be phase-shifted by two or more known values relative to its nominal position. For example, the projector 14 can be configured to shift the fringe pattern 50 by shifting the diffraction grating so that the maximum intensity peak 54 of the center fringe $N_o$ is shifted either to the right or left of the point $P_o$ by a known amount (e.g., ±120°, or ±⅔π)

Referring again to FIG. 3, the fractional phase $φ_{frac}$ can be unambiguously calculated if an image of the fringe pattern 50 is acquired at each of three different known phase shifts (e.g., +120°, 0° and −120°). For each image 62, the intensity I detected by the pixel 66 is determined (e.g., $I_{+120}$, $I_0$ and $I_{-120}$). While phase shifts of ±120° and the reference position of 0° are used in the present example, it should be appreciated that other numbers of phase shifts and other values of phase shift can be utilized in the technique.

The location of the zero degree reference phase in the image 62 is determined so that the portion of the total phase φ that includes the integer number of fringes can be determined. Although the zero degree reference phase is indicated in the image 62, the corresponding center fringe $N_o$ is otherwise not readily apparent as the fringes $N_{+3}$ to $N_{-3}$ appear identical. This fringe similarity results in a "2π ambiguity because there is no analysis of a single image that yields the integer number of fringe peaks from the 0° phase fringe and the point P. Resolving the 2π ambiguity to determine the integer number of peaks contributing to the phase φ is referred to in the art as "fringe unwrapping."

Figure 4:
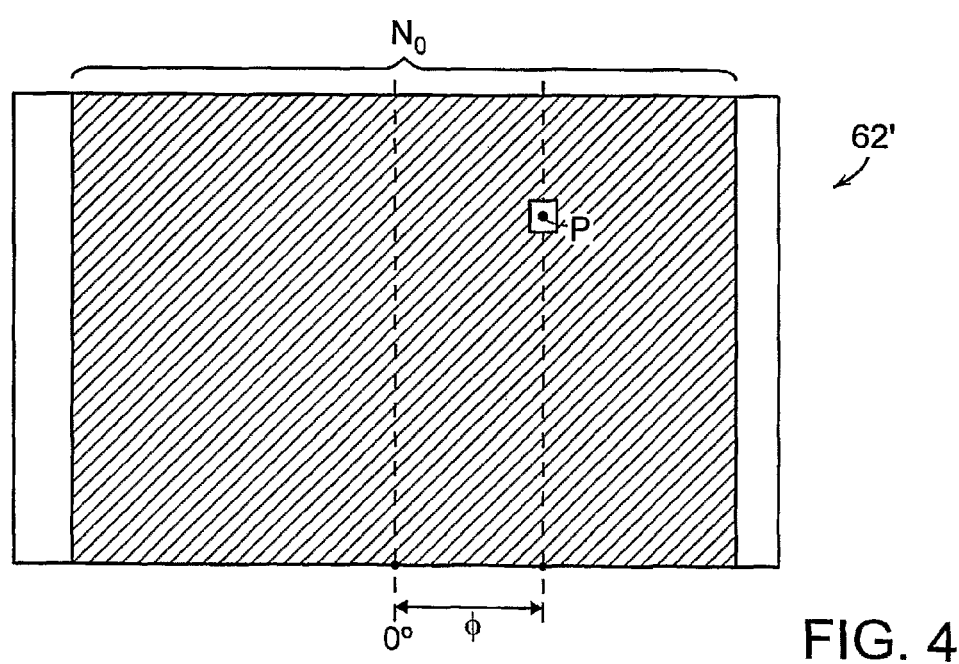
FIG. 4 shows a view of a portion of an image of the surface of the object of FIG. 2 as irradiated by a second fringe pattern.

Fringe unwrapping can be described with reference to FIG. 4 in which an image 62' of a different fringe pattern projected onto the object surface is acquired. In this instance the projector irradiates the object surface with a coarse (i.e., lower spatial frequency) fringe pattern. The coarse fringe pattern includes only one fringe within the camera field of view, namely the central fringe $N_o$, wherein the fringe pattern is calibrated to have the same zero degree reference phase as the fringe pattern 50 shown in FIG. 2 and FIG. 3. Using only the single central fringe $N_o$, the phase φ corresponding to the point of interest P can be determined directly using the phase shift technique discussed above. Ambiguity is avoided because the phase φ variation across the image 62' is less than 2π. It should be appreciated, however, that the smaller slope of the coarse fringe pattern results in a lower resolution and accuracy for the determination of the phase φ and the distance $z_P$. Thus the accuracy of the calculated distance $z_P$ can be unacceptable for many applications.

In view of the above limitations, an iterative technique can be employed in which the projector is configured to alternately project coarse and fine fringe patterns onto the object surface wherein the 0° reference phases for the coarse and fine fringe patterns are precisely calibrated to have a known relationship. For each projection of a coarse or fine fringe pattern, three or more images are acquired to implement the phase shift technique described above. In one example utilizing only three phase positions, a coarse fringe pattern is projected, imaged, phase shifted once, imaged again, phase shifted a second time, and imaged again to acquire a total of three images. The same three image procedure is implemented for the fine fringe pattern. Based on the acquisition of the three fine fringe images, a higher resolution determination of the fractional phase $φ_{frac}$ can be determined. Using a known phase relationship between the coarse and fine fringe patterns, a higher resolution determination of the phase φ (a "fine φ") can be determined using the coarse φ and the fractional phase $φ_{frac}$. In this manner, the coarse phase φ is used to "unwrap" the fringe number for the fractional phase $φ_{frac}$ to permit determination of the fine phase φ. Finally, a higher resolution determination of the distance $z_P$ is calculated based on the fine phase φ. The foregoing unwrapping procedure is performed for each pixel to determine respective x, y and z coordinates and to generate a comprehensive higher resolution profile, or map, of the surface contour.

While in some instances the iterative unwrapping technique permits the phase φ to be determined with sufficient resolution, generally it is difficult to generate coarse fringe patterns in which only one central fringe is projected in the field of view. To generate coarse fringe patterns using an interferometer employing a diffraction grating, a large grating pitch d is required. However, as the grating pitch d is increased, the grating generally becomes less efficient, that is, less optical power is diffracted into the non-zero order modes. Consequently, the available laser power can limit the grating pitch d if sufficient laser power is not otherwise present in the first order modes to generate fringe pattern intensities sufficient for imaging.

One conventional technique for simulating a coarse fringe pattern employs two less coarse (i.e., higher spatial frequency) diffraction gratings having slightly different grating pitches d. Consequently, the fringe patterns generated by such gratings have similar but not identical spatial frequencies. Images of the two fringe patterns are analyzed to determine a beat frequency between the similar spatial frequencies to synthesize a significantly coarser fringe pattern for the determination of the phase φ without any 2π ambiguity. Although the synthesized coarse fringe pattern requires an additional diffraction grating, the optical power efficiency limitation typically associated with a single coarse diffraction grating is eliminated.

In some implementations of the above iterative measurement technique, the diffraction gratings are sequentially moved into the path of a laser beam to generate the different fringe patterns. In particular, each diffraction grating generates a set of diffracted beams which are focused by an objective and spatially filtered to isolate the pair of first order beams to generate the fringe pattern. The distance between the apertures of the spatial filter and the size of the apertures are selected to accommodate the different source separation distances (e.g., $a_{frac}$ and $a_{coarse}$) between the focused first order beams. Thus, a single channel interferometer projector is implemented in which different diffraction gratings are multiplexed into the beam path to generate different fringe patterns.

One aspect of the present invention is directed to a multiple channel interferometer projector that can be employed as a replacement for the projector 14 in the measurement system 10 depicted in FIG. 1 and FIG. 2. The multiple channel interferometer projector includes two or more interferometer channels that are spatially separated from each other. The multiple channel interferometer projector achieves a significant improvement in system performance and measurement accuracy in comparison to the single channel interferometer projectors discussed above.

Advantageously, as an optical component set is provided for each of the interferometer channels, the need to alternately move different diffraction gratings into the coherent beam path is eliminated. Instead, the only grating movement is a significantly smaller grating displacement for each diffraction grating relative to a reference phase position to implement the phase shifting technique described above. The major reduction in the grating displacement yields a significant decrease in the mechanical complexity, weight and size of the projector, an improvement in overall projector stability, and a significant increase in measurement speed and accuracy. Another advantage is the higher system reliability provided by the projector. If one of the interferometer channels fails to operate properly, surface contour measurements may still be possible using the other channels. Moreover, in some instances, if data obtained using one of the channels is inconsistent with data obtained from other channels, the suspect data can be ignored and the user can be alerted to the discrepancy.

The multiple, spatially diverse interferometer channels provide additional advantages. Averaging the measurements obtained from multiple channels results in a decrease in the effect of optical noise on the calculated surface contour data. For example, measurement error introduced by photon shot noise and speckle decreases by an amount proportional to the square root of the number of channels averaged. In particular, speckle error is significantly reduced by analyzing multiple images having uncorrelated speckle due to the spatial separation and associated angle diversity between the two fine interferometer channels. As a result, the z coordinates of an imaged surface contour can be determined with high accuracy over a large field of view. In various embodiments described below, the z coordinates can be determined with an accuracy of better than 10 micrometers over a 0.5 meter field of view.

A further advantage of multiple channels is the reduction of the effects of projector optical aberrations on measurement accuracy. Each interferometer channel exhibits inaccuracies due to specific optical aberrations caused by the optical components in the channel. However, multiple channel measurements are averaged together to generate a final measurement result and the effect of individual channel aberration errors are decreased due to the uncorrelated nature of the aberrations between channels.

Based at least in part on the noise reduction advantages provided by a multiple channel interferometer projector according to various embodiments of the present invention, the spatial frequency of the fine fringe patterns can be reduced in many applications while maintaining sufficient measurement resolution. As previously described, utilizing fine fringe patterns of high spatial frequency for increased measurement resolution can limit the practical imaging depth of field of the camera, therefore there can be a compromise required between measurement resolution and imaging depth of field. The substantial noise reduction in the measurement process achieved with the multiple channel interferometer of the present invention can, in many instances, provide a significant improvement in signal-to-noise ratio to allow a reduction in the spatial frequency of the fine fringe patterns without sacrificing a desired measurement resolution or a greater imaging distance between the camera and the object surface.

Figure 5B:
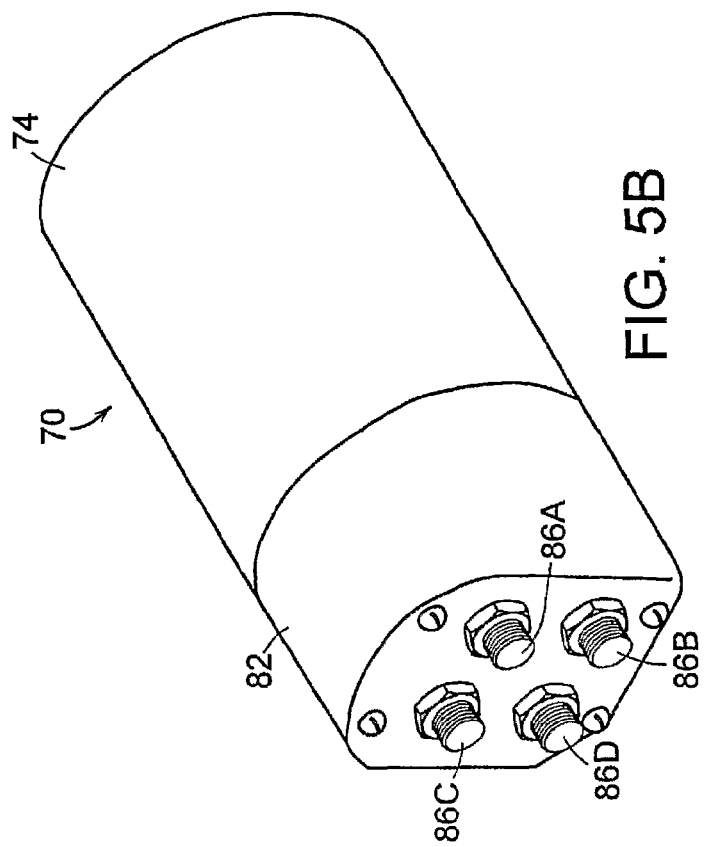
FIG. 5A and FIG. 5B illustrate front and rear perspective views, respectively, of a multiple channel interferometer projector according to an embodiment of the invention.
Figure 5A:
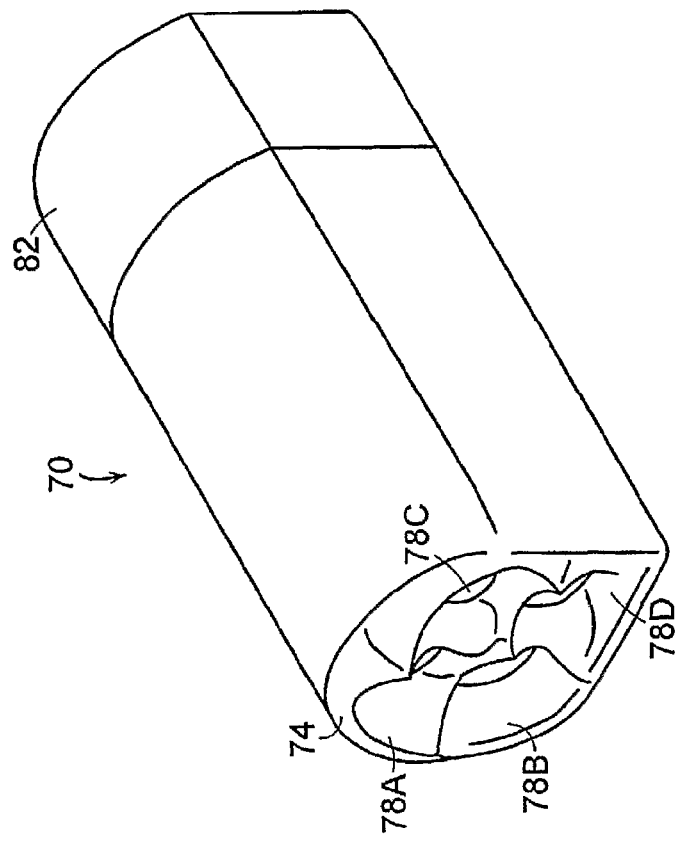

FIG. 5A and FIG. 5B illustrate front and rear perspective views, respectively, of a multiple channel interferometer projector 70 constructed in accordance with the present invention. In the illustrated embodiment, the projector 70 has an approximately cylindrical form, a length of approximately 140 millimeters, a diameter of approximately 65 millimeters and a weight of less than 1 kilogram. The projector 70 includes four interferometer channels although in other embodiments different numbers of channels are employed. The projector 70 includes a front end cap 74 having four passageways 78A, 78B, 78C and 78D (generally 78) through which pass the optical radiation from the interferometer channels. A rear end cap 82 includes four optical couplers 86A, 86B, 86C and 86D (generally 86) to provide for coupling an optical light source to each of the four interferometer channels.

The interferometer channels can be sourced by a single laser beam that is multiplexed in space and optionally in time. In one exemplary implementation, a single laser source is separated into four optical signals and each optical signal is coupled to a respective one of the four optical couplers 86, for example, by an optical fiber. Alternatively, one or more interferometer channels are sourced by a dedicated laser source such that at least two laser sources are utilized with the projector 70. According to one implementation, a laser source used for the multiple channel interferometer projector 70 of the present disclosure has a wavelength of 658 nanometers and generates approximately 50 to 100 milliwatts of optical power.

In another embodiment, different interferometer channels of the projector 70 utilize different wavelengths of radiation. The fringe patterns generated by two or more spatially-separated different-wavelength interferometer channels are projected simultaneously onto an object surface, imaged simultaneously by a camera, and processed separately according to the wavelengths. For example, image data generated at the camera can be separated according to color and processed independently. Alternatively, fringe patterns projected by two or more spatially-separated different-wavelength channels can be temporally multiplexed and synchronized with data acquisition by the camera for separate processing.

FIG. 6A and FIG. 6B illustrate front and rear exploded perspective views, respectively, of the projector 70 shown in FIG. 5A and FIG. 5B. According to the illustrated embodiment, a number of separate modules are mechanically coupled to form the projector 70. Each module includes one or more components for each interferometer channel so that a total of four component sets are employed per module. Each component set of a given module comprises a particular functional portion of a respective one of the four interferometer channels.

More specifically, the projector 70 includes a collimator lens module 90 including four fiber couplers 94A, 94B, 94C and 94D and four collimator lenses 98A, 98B, 98C and 98D (generally 98). Each coupler-lens pair receives laser light in a respective interferometer channel. The laser light is supplied to the projector 70 through optical fibers secured by the couplers 86 of the rear end cap 82. The collimator lens module 90 is configured such that an end face of the optical fiber for each channel is aligned to a corresponding collimator lens 98.

The projector 70 also includes a diffraction grating module 102 that includes four diffraction gratings. In one embodiment, the diffraction gratings are integral to a common substrate disposed over four clear apertures 108A, 108B, 108C and 108D so that each grating is irradiated with collimated laser light from a corresponding lens 98 in the collimator lens module 90. In another embodiment, the four diffraction gratings, 110B, 110C and 110D (generally 110) are individually fabricated and then attached to a common platform 106 as shown in FIG. 7. In one exemplary implementation, the module 102 has an approximate diameter D of 67 millimeters and an approximate thickness T of 19 millimeters. The common substrate 106 (or platform) can be laterally displaced along a direction perpendicular to the central axis of the projector 70 such that the fringe patterns projected on an object surface are translated along a direction parallel to the x-axis of the coordinate system 30 (see FIG. 3). The diffraction grating module 102 can include a single axis translation stage coupled to the common substrate 106 (or platform), one or more actuators (e.g., piezoelectric transducers) and one or more high accuracy position sensors (e.g., capacitive probes) to provide closed-loop precision shifting (i.e., "micro-positioning") for implementing the phase shift technique described above.

Preferably only the first diffraction orders generated by the diffraction gratings 110 are used to generate the two sources of radiation used for each interferometer channel. In a preferred embodiment, the diffraction gratings 110 are transmissive optical components configured for high efficiency of the first diffraction orders. For example, to achieve a near-optimum first order efficiency, the diffraction gratings are configured as 50% duty cycle binary phase gratings having a phase depth of one-half the wavelength λ of the laser light or, equivalently, the physical depth δ of the grating thickness variation is λ/2(n−1) where n is the index of refraction of the grating substrate 106. Diffraction gratings fabricated with these properties can transmit approximately 81% of the incident laser light in the first order beams. In an exemplary embodiment, the diffraction gratings 110 are fabricated on a fused silica substrate having an index of refraction n of 1.457 at a wavelength λ of 658 nanometers. Based on these parameters, the physical depth δ of the gratings is 0.72 micrometers and the first order beams include approximately 79% of the optical power in the incident laser beam. In another embodiment, the diffraction gratings 110 are fabricated on a fused silica substrate having a thickness of approximately 2.5 millimeters. Four grating patterns are written on a photomask covering the substrate using electron beam lithography and ion etching is used to form the patterns in the fused silica. Each diffraction grating 110 is rectangular with dimensions of approximately 8 millimeters by 10 millimeters. Once the diffraction gratings are formed, both sides of the grating substrate are anti-reflection (AR) coated. For example, a multi-layer dielectric AR coating can be applied to limit the reflectivity per surface to be less than 0.5% at the operating wavelength λ.

Figure 8A:
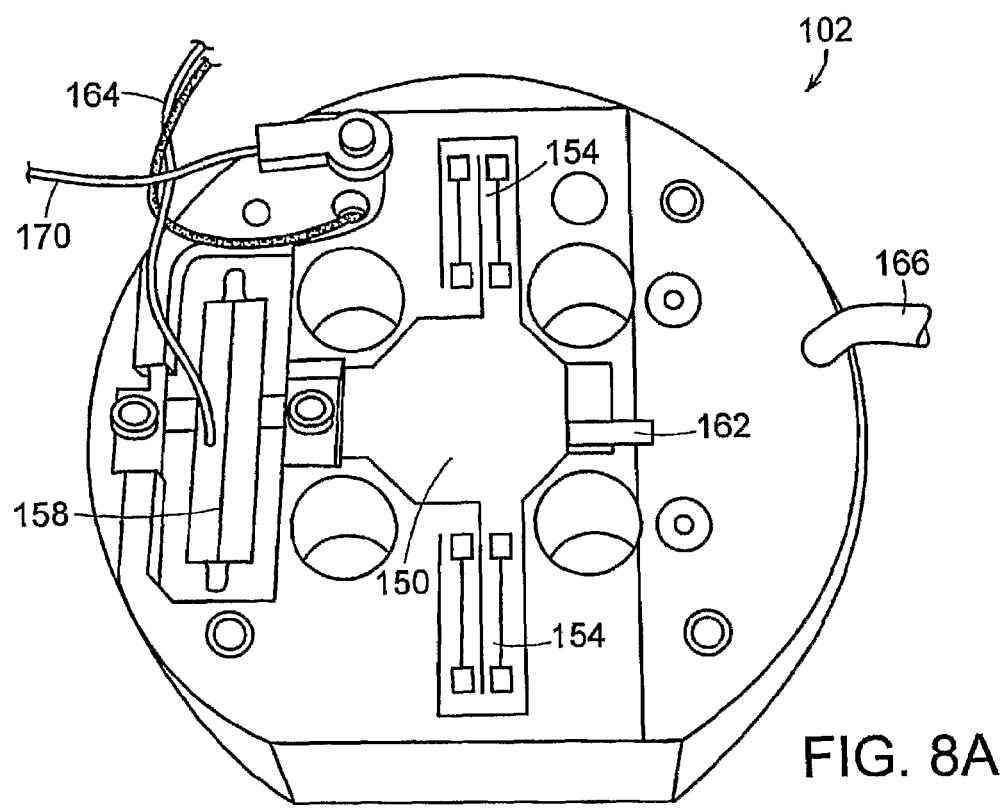
FIG. 8A and FIG. 8B illustrate rear and front perspective views, respectively, of the diffraction grating module of FIG. 7 with the grating substrate removed.
Figure 8B:
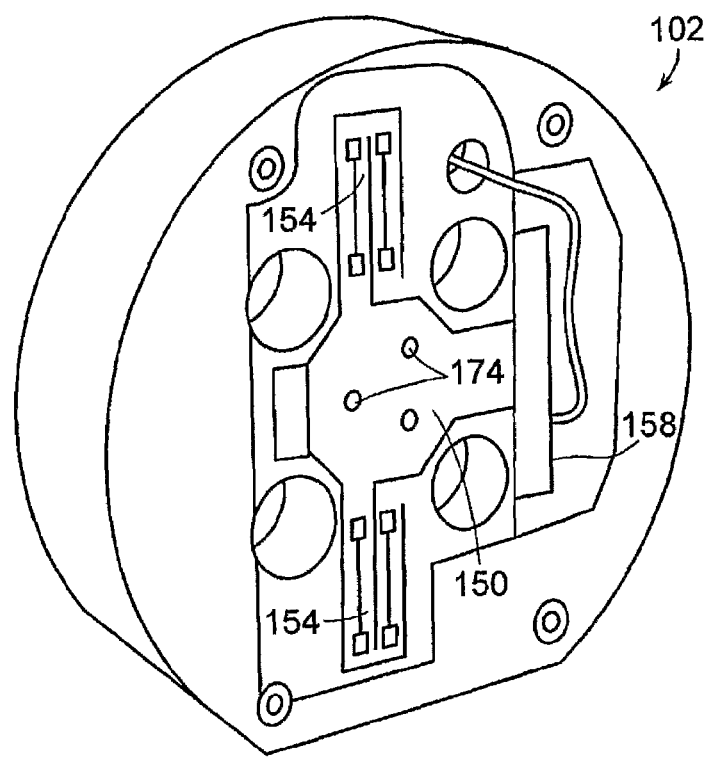

FIG. 8A and FIG. 8B illustrate detailed rear and front views, respectively, of the diffraction grating module 102. The grating substrate is not shown so that other components of the module 102 can be viewed. A centrally located translation stage 150 provides movement along a single axis parallel to the bottom flat edge of the module 102. The translation stage 150 includes small threaded bores 174 for attachment of the grating substrate 106 using screws. Alternatively, any of a variety of adhesives can be used to attach the grating substrate 106.

The movement of the stage 150 is facilitated by two symmetrically disposed flexure assemblies 154. An electrically controlled actuator 158 (e.g., a piezoelectric transducer) coupled to the translation stage 150 provides precise linear motion by exerting a force on the stage 150 that deflects the flexure assemblies 154. A precision position sensor 162 such as a capacitive probe is coupled to the stage 150 to detect motion.

In one embodiment, the actuator 158 and the position sensor 162 are part of a closed-loop servo control system for positioning the stage 150. For example, the actuator 158 is controlled by electrical signals transmitted over wires 164 and a feedback signal from the position sensor 162 is transmitted over cable 166. A wire 170 is coupled to a reference voltage (i.e., ground, not shown) and a ground plane of the module 102. In one exemplary implementation, the translation stage 150 and control components are configured to facilitate stage movement over a range of approximately 250 micrometers, with a positional resolution of approximately 30 nanometers. A translation stage assembly and associated control components similar to those described above are available from Dynamic Structures and Materials, LLC, of Franklin, Tenn.

In one embodiment, at least one of the actuator 158 and the position sensor 162 are coupled to a processor (e.g., processor 30 in FIG. 1) through the wires 164 and cable 166), and the processor can be configured to implement a servo control loop for precision movement of the translation stage 150. Other control components can be employed in addition to or in place of the processor to facilitate control loop signal conditioning and amplification.

Referring again to FIG. 6A and FIG. 6B, the projector 70 also includes an objective and spatial filter module 114 to optically process the laser light from the diffraction gratings. The module 114 includes four projection lenses 118A, 118B, 118C and 118D (generally 118). Each lens 118 focuses the first order diffracted beams from a respective diffraction grating. Preferably, the focal length of each lens 118 if manufactured to a tolerance to ensure that the focused beams are aligned with the apertures of a respective spatial filter. The focal length can vary according to implementation. In one exemplary implementation, each lens has an effective focal length of 8 millimeters. The numerical aperture of each projection lens determines how quickly the fringe pattern expands as it exist the projector 70 and, therefore, can be selected to accommodate the required standoff distance between the projector 70 and the object surface. In one implementation the numerical aperture is 0.45 and the angle of the first order beams with respect to the channel axis is approximately ±0.2°. Each projection lens 118 is adapted to operate over a finite wavelength range about the wavelength λ for a given channel (e.g., 20 nanometers) to accommodate small changes in wavelength, for example, due to changes in operating temperature. Preferably, each projection lens 118 has an AR coating such as a multiple-layer dielectric coating for improved optical transmission.

Each diffraction grating is positioned relative to a respective lens 118 such that the plane of the diffraction grating is imaged onto the object surface. Consequently, any error in the pointing angle of the laser illumination of a grating does not result in a significant change in the position of the $N_0$ fringe location at the object plane.

The objective and spatial filter module 114 also includes four spatial filters 122A, 122B, 122C and 122D (generally 122). Each spatial filter 122 includes two spaced apart pinhole apertures to pass the focused beams of the first diffracted orders. In one exemplary implementation, each spatial filter 122 is constructed of a thin fused silica substrate coated with an opaque metal layer such as a chromium layer. The metal layer is etched using a photolithographic technique to create two transparent pinholes. The fused silica substrate has an AR coating on both sides for improved transmission through the pinhole apertures.

The spatial filters 122 provide a significant advantage over spatial filters employed in conventional interferometer projectors. More specifically, conventional projectors utilize a spatial filter having multiple pairs of pinhole apertures with each pair matched to a particular diffraction grating. Thus only one pair of pinhole apertures provides the desired beams. Other pairs of pinhole apertures can pass coherent light which can create other less intense fringe patterns having different spatial frequencies on the object surface. As a consequence, the surface contour data is less accurate and can exhibit harmonic variations.

The optical reflectivity of the surface of an object can vary with position. As a result, an image of the object surface can include significant variations in intensity independent of the fringe intensity variations. Such intensity variations can prevent observation of the fringe pattern in portions of the image or can result in image saturation in other portions of the image.

In one embodiment of the present invention, optical processing methods and devices compensate for intensity variations in the fringe patterns due to varying surface reflectivity. In one exemplary implementation, the compensation is based on modifying the intensity profile of a fringe pattern (i.e., "intensity shaping") at the projector. In one embodiment, the projector 70' includes an intensity shaping module 124 disposed between the front end cap 74 and the objective and spatial filter module 114 as shown in FIG. 9. The intensity shaping module 124 includes four optical processors 128A, 128B, 128C and 128D (generally 128). In a preferred embodiment, the intensity shaping module 124 is positioned in the collimated beams between the collimator lens module 90 and the diffraction grating module 102. In another embodiment, the intensity shaping module 124 includes a single optical processor that performs optical processing for two or more channels.

The optical processors 128 are configured to selectively attenuate portions of one or more fringe patterns projected from the focusing objective and spatial filter module 114. In one exemplary implementation, one or more of the optical processors 128 are provided as high resolution liquid crystal displays (LCDs) wherein the optical transmissivity of individual pixels of each LCD are individually controlled, for example, by a processor such as that depicted in FIG. 1. In this manner, intensity shaping of the projected fringe pattern can be utilized to compensate for a variety of complex surface reflectivities.

Figure 10:
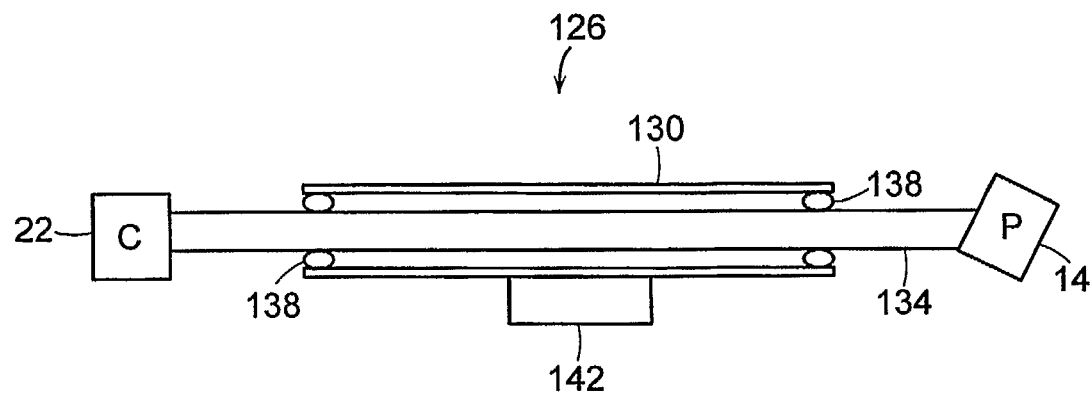
FIG. 10 is a cross-sectional diagram of a crossbar for rigidly coupling a camera to a projector according to an embodiment of the invention.
Figure 11:
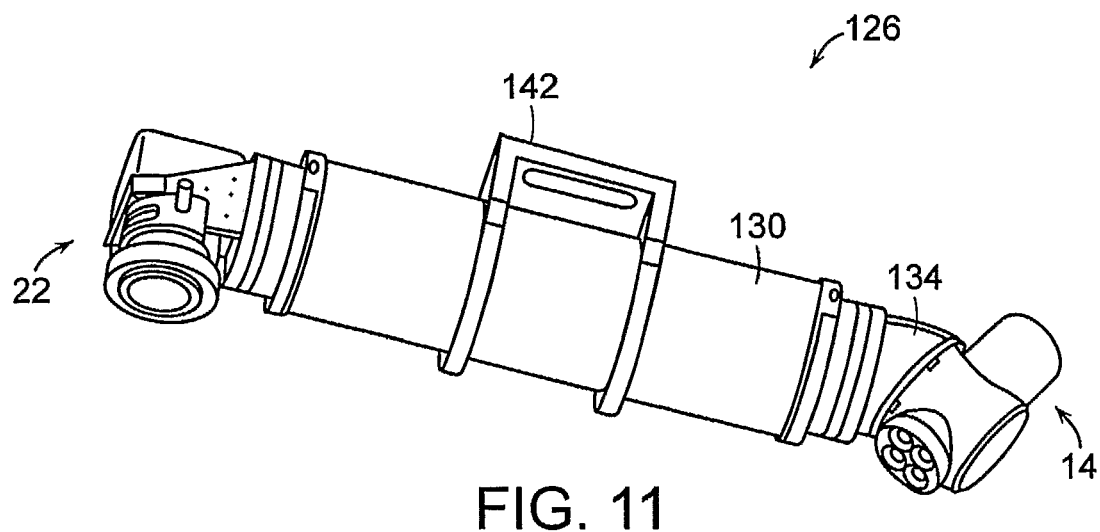
FIG. 11 is a perspective view of a crossbar for rigidly coupling a camera to a projector according to an embodiment of the invention.

Although the embodiments described above relate primarily to a projector for a multiple channel interferometric surface measurement system, the invention also contemplates system embodiments having a crossbar that provides improved structural, thermal and load stability. FIG. 10 is a cross-sectional block diagram depicting a crossbar 126 for rigidly coupling a camera 22 to a projector 14 according to an embodiment of the invention and FIG. 11 shows a perspective view of an assembled crossbar 126. The crossbar 126 is configured as a sleeve-like structure that includes an outer tube 130 coupled to an inner tube 134 through two O-rings 138. The O-rings 138 are located along the length of the inner tube 134 at two positions determined to significantly reduce changes in the orientation of the camera 22 relative to the projector 14 and to significantly reduce changes in the translation of the camera 22 and the projector 14 relative to a mounting plate 142 secured to the outer tube 130. The changes are due primarily to gravity and typically occur when the crossbar 126 is reoriented. The body weight of the inner tube 134 compensates for angular changes caused by the two loads (i.e., the camera 22 and the projector 14). The O-rings 138 reduce local stresses and distribute the weight of the inner tube 134 over a significant surface area of the inner surface of the outer tube 130. In one embodiment, the inner tube 134 is kinematically constrained for axial and radial movement. Preferably, the outer tube 130, inner tube 134 and mounting plate 142 are fabricated from identical materials or materials for which the coefficients of thermal expansion are closely matched so that thermal changes in the measurement environment do not significantly affect measurement accuracy. In one embodiment, the outer tube 130, inner tube 134 and mounting plate 142 are fabricated from aluminum.

The phase shifting technique described above relies on closed-loop precision translation, or "micropositioning," of the diffraction gratings to a high degree of accuracy. To accomplish this micropositioning, the projector 70, as described above in relation to FIG. 6A and FIG. 6B includes one or more actuators (e.g., piezoelectric transducers) and one or more high-accuracy position sensors. For example, capacitive probes can be used to measure the position of the diffraction grating to within about 20-30 nanometers. The position sensors can be calibrated to measure position with the necessary accuracy for short durations. However, over longer durations (e.g., days, weeks, or longer), other effects, such as degradation in cable properties and changes in dielectric constants may degrade the positional accuracy of the sensor. Thus an independent, accurate position sensor is useful in measuring the "true" position of the diffraction grating once the diffraction grating is positioned and measured with the capacitive probe.

One technique for independently and accurately sensing position of the diffraction grating is to optically sense the position of the projected fringes at the projector. An optical sensor is used to receive the projected fringe. To assure positional accuracy, the optical sensor is rigidly mounted to the projector.

Figure 12:
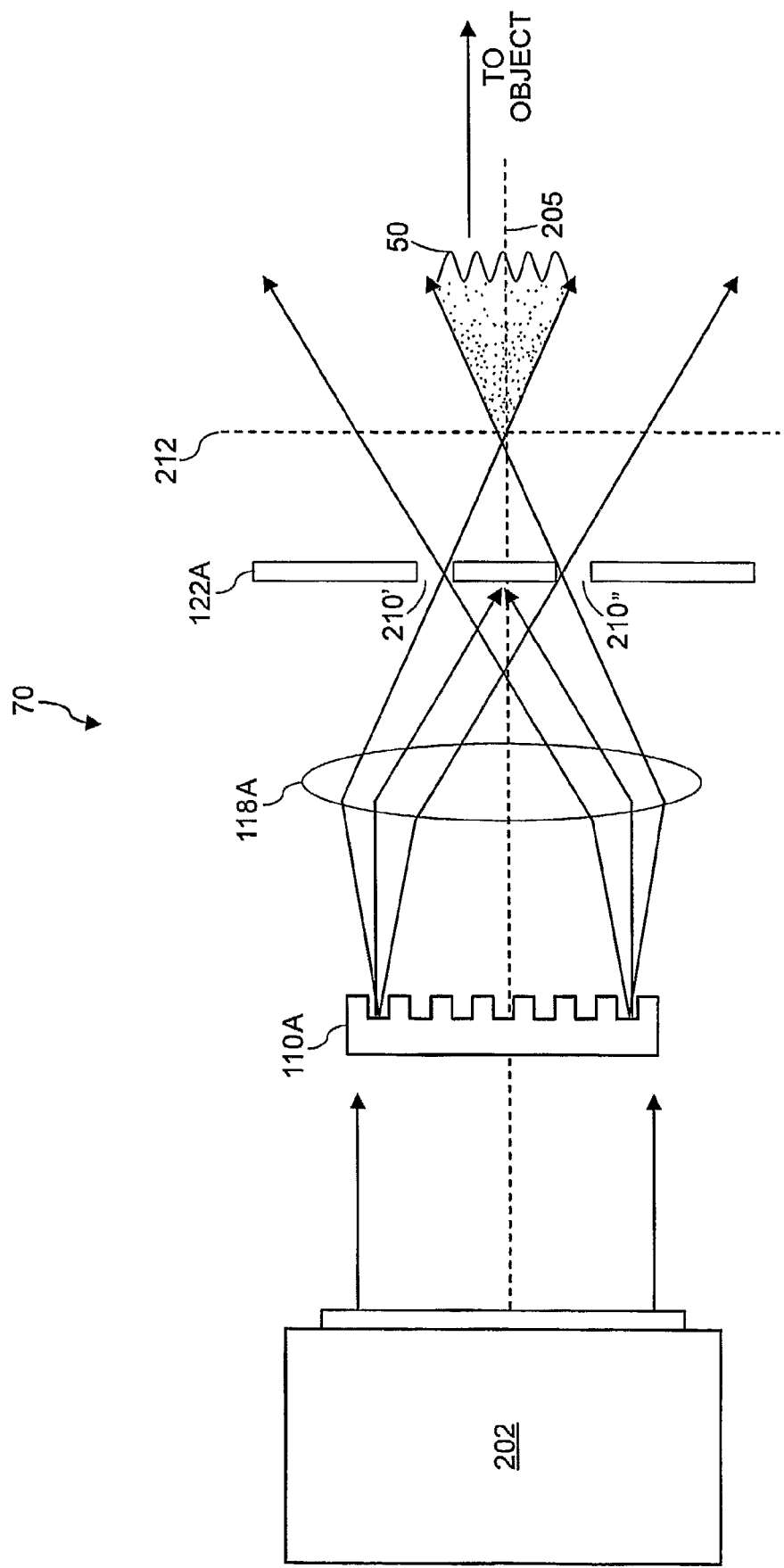
FIG. 12 is a schematic diagram of an interferometric projection system for irradiating an object with structured light patterns generated according to interferometric principles.

FIG. 12 shows a schematic diagram of one channel of an exemplary interferometer projector 70 for irradiating an object with structured light patterns generated according to the interferometric principles described above. The projector 70 includes an optical source 202 producing a collimated beam of light directed along an optical axis 205 and onto a diffraction grating 110A. In this example, the transmissive diffraction grating 110A diffracts the incident collimated light. A focusing objective lens 118A is positioned between the diffraction grating 110A and a spatial filter 122A. The spatial filter 122A is disposed in a focal plane of the focusing objective lens 118A, such that the diffracted beams are focused onto one side of the spatial filter 122A. The spatial filter 122A includes two pinhole apertures 210', 210" (generally 210) suitably positioned to receive one ordered pair of the focused diffracted beams. As shown, the apertures 210 are aligned with the first-order pair of diffracted beams. The two diffracted beams interfere with each other after passing through the spatial filter 122A. A structured light pattern, or fringe pattern 50, exists in a region of beam overlap beyond a fringe boundary 212.

An optical sensor is placed beyond the fringe boundary 212 and illuminated by the fringe pattern. Unfortunately, positioning an optical sensor in the direct path of the projector interferes with the fringe patterns meant for the object. One solution is to dedicate one channel of a multi-channel interferometric projector 70 described in FIG. 6A and FIG. 6B to an optical sensor to determine the position or the positional error of the diffraction gratings. Thus, for the exemplary four-channel projector 70, one channel is used for fringe position measurements, leaving the remaining three channels to irradiate the object.

Figure 13:
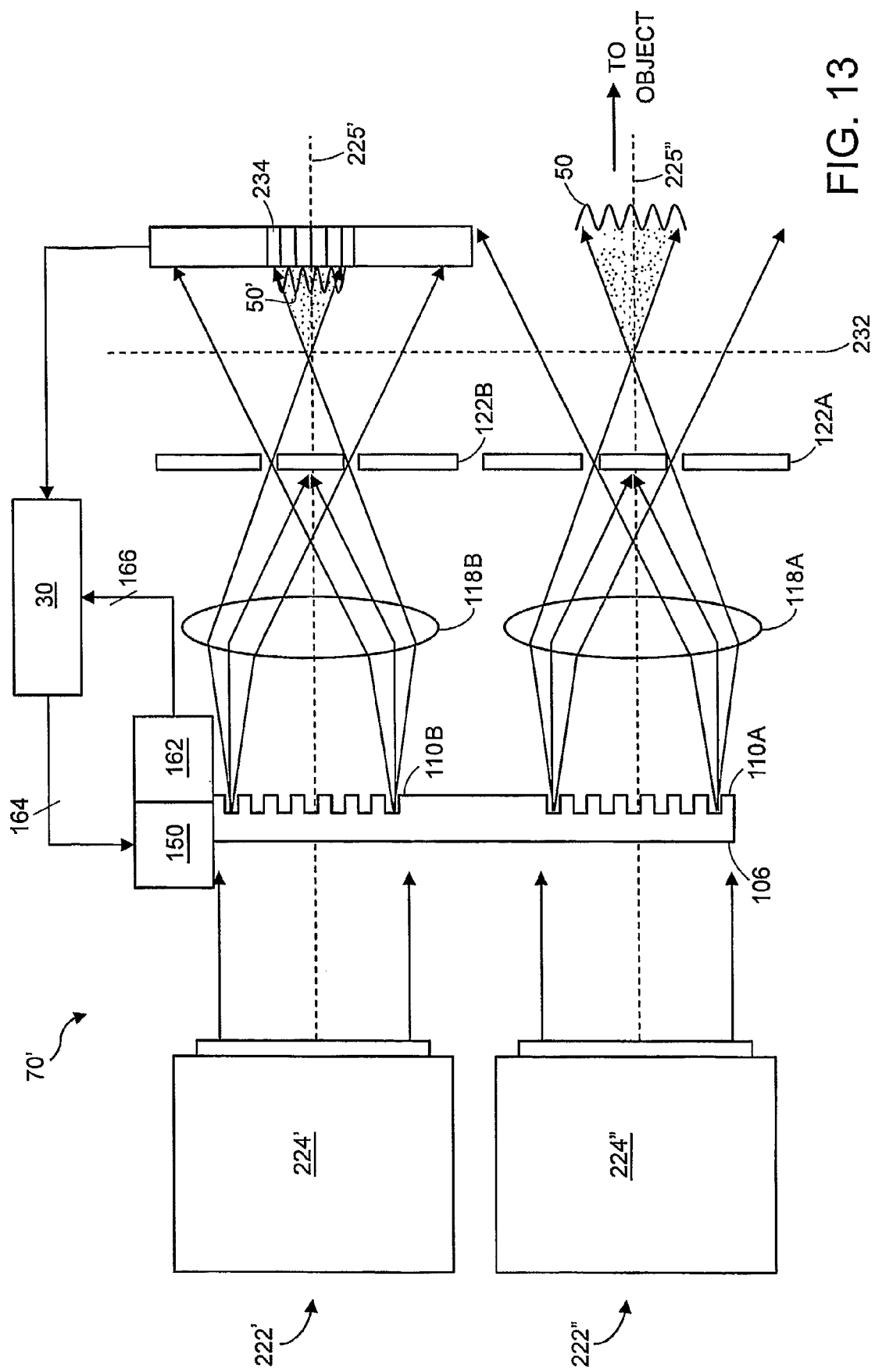
FIG. 13 is a schematic diagram of a multi-channel interferometric projection system including an imager directly samples a structured light pattern of one of the channels in accordance with the principles of the invention.

FIG. 13 shows a schematic diagram of a multi-channel interferometer projector 70', in which one or more of the channels 222', 222" (generally 222) is used to implement an optical sensing technique for determining one or more of the position, rotation and scale of the projected fringe patterns 50, 50'. In general, the multi-channel interferometric projector 70' includes at least two optical channels 222, each having a respective optical source 224', 224" (generally 224) producing a collimated light output directed along a respective, spatially separate optical axis 225', 225" (generally 225). In an exemplary embodiment, one of the optical channels 222' is dedicated to optically sensing a projected fringe pattern 50'. Namely, the fringe pattern generated by this dedicated sensing channel 222' is used only for optical sensing of one or more of position, rotation, and scale for diffraction gratings 110 of the multi-channel projector 70', and is not actually projected to irradiate an object surface. In some embodiments, the optical sources 224 are similar to the multi-channel sources described in relation to FIG. 6A and FIG. 6B.

Dedicating one of the channels 222 for determining position or positional error of the fringe pattern 50' enables the use of a lower power optical source for that channel. For example, a directly coupled, low-power laser diode (e.g., 2 milliwatts or less) can be used, as appreciably less power is required for the optical sensing function than is necessary for projection of fringe patterns onto the object surface. Although stability and repeatability of the projected fringe patterns 50 is critical, there is no requirement for the optical components of the dedicated channel 222' to be equivalent to the optical components of the other channels 222". For example, a different objective lens and diffraction grating can be used as long as the diffraction gratings 110 of the optical sensing channel 222' and projection channels 222" are rigidly coupled to one another on a common positioning stage 106.

The collimated light from each of the optical sources 224 irradiates a respective diffraction grating 110. In other embodiments, the diffraction gratings can be reflective diffraction gratings. Each of the channels 222 also includes a respective focusing objective lens 118 and a respective spatial filter 122 suitably positioned to pass a desired ordered pair of diffracted beams, thereby producing a respective fringe pattern 50, 50' beyond respective fringe boundary 232.

The dedicated channel 222' includes an imager 234 positioned beyond the fringe boundary 232 to receive at least a portion of the fringe pattern 50'. The imager 234 is rigidly mounted to the projector 70' at a known location, preferably close to the spatial filter 122B to minimize size but beyond the fringe boundary 232. In one embodiment, the imager 234 is mounted to the objective and spatial filter module 114 (see FIG. 6A and FIG. 6B). In some embodiments, the imager 234 is a two-dimensional array of optical detectors. For example, the imager 234 can include a charge-coupled device (CCD) array. In some embodiments, a conventional video graphics array (VGA) chip, similar to those typically employed for webcam applications is used as the imager 234, wherein the chip has an imaging plane of 640×480 pixels, although higher resolution arrays are readily available.

In some embodiments, the pitch d of the diffraction grating 110B can be selected such that approximately 8 to 120 fringes are projected across the active area of the imager 234. Based on an exemplary active area of 640×480 pixels, an imaging resolution of 5 pixels/fringe to 80 pixels/fringe for the optical sensing channel 222' can be realized.

The multi-channel interferometer projector 70' also includes a positioning stage 150 (e.g., translation stage) mechanically coupled to the diffraction gratings 110. The positioning stage 150 translates the diffraction gratings 110 along a single axis in a plane perpendicular to the optical axis. In other embodiments, positioning stages can be used to realize one or more of translation and rotation. Although translation along a single axis can be sufficient for the applications described above in which diffraction gratings are moved to produce a predictable phase offset, the more general displacements allow compensation for positioning errors associated with the diffraction gratings 110, as described more fully below. A precision position sensor 162, such as the capacitive probe, is coupled to the positioning stage 150 to detect displacement.

The imager 234 is coupled to a processor 30 which receives the image data. The processor 30 determines positional information of the diffraction grating 110 from the image data and determines whether the fringe pattern 50' conforms to an expected fringe pattern and fringe pattern position. If the positional information does not conform to the expected fringe pattern, the processor 30 can determine position error in one or more of displacement, rotation, and frequency. The positional information can indicate the position and orientation of the associated diffraction gratings 110 on a carrier or common substrate 106. In some embodiments, the positional information can also indicate positional changes of other components in the projector channel 222'. Advantageously, if two or more diffraction gratings 110 are rigidly coupled to each other, the positional information of the dedicated channel 222' also indicates the positional information of other channels 222.

In some embodiments, the processor 30 receives an input signal from the position sensor 162. The processor 30 transmits an output signal to the positioning stage 150. The input signal indicates the position of the diffraction gratings 110. The indicated position can be inaccurate if, for example, the position sensor requires recalibration. By comparing the indicated position based on the position sensor 162 and the determined position according to the image data, the processor 30 determines an offset or error value. In some embodiments, the error value is provided to the positioning stage 150 to adjust the position of the diffraction gratings 110. Alternatively, the processor 30 can use the offset or error value in the determination of surface contour data without requiring positional adjustment. Optionally, the error value can indicate that some recalibration and/or repair of the projector 70' is required.

In general, the fringe pattern 50' generated by the dedicated channel 222' and imaged by the imager 234 can be used for a variety of purposes. For example, in various embodiments, multiple images of the fringe pattern 50' are acquired over time, saved, and compared to each other to assess any changes in one or more of the position, rotation, or scale of the fringe pattern 50'. For example, changes can result from thermal expansion or contraction of the grating substrate 106 or other projector components, or indicate other problems with channel components that can occur over time. Since all of the diffraction gratings 110 of the projector 70' are rigidly positioned with respect to each other, any changes in the fringe pattern 50' generally indicate similar changes in the fringe patterns 50 projected by the other channels 222.

In various aspects, an assessment of fringe pattern position via an optical sensing technique is useful for initially establishing a reference phase position for all of the fringe patterns, and subsequently monitoring the fringe pattern position over time to assess any changes from the reference phase position.

Additionally, in one embodiment, optical sensing of the fringe pattern 50' generated by the dedicated channel 222' can be employed to determine relative shifts in fringe pattern position (i.e., translation) during the phase shift technique described above. In one aspect of this embodiment, the need for a capacitive probe can be eliminated, and the actuator for the positioning stage 150 can be operated in either an open-loop control configuration or with feedback provided by the optical sensing of the fringe pattern 50'.

In yet another aspect, both optical sensing and a capacitive probe can be employed for precision assessment of diffraction grating translation during the phase shift technique, wherein a less expensive capacitive probe (e.g., having smaller range and/or accuracy) can be employed and information obtained by the imager 234 supplements information obtained from the capacitive probe.

Figure 14:
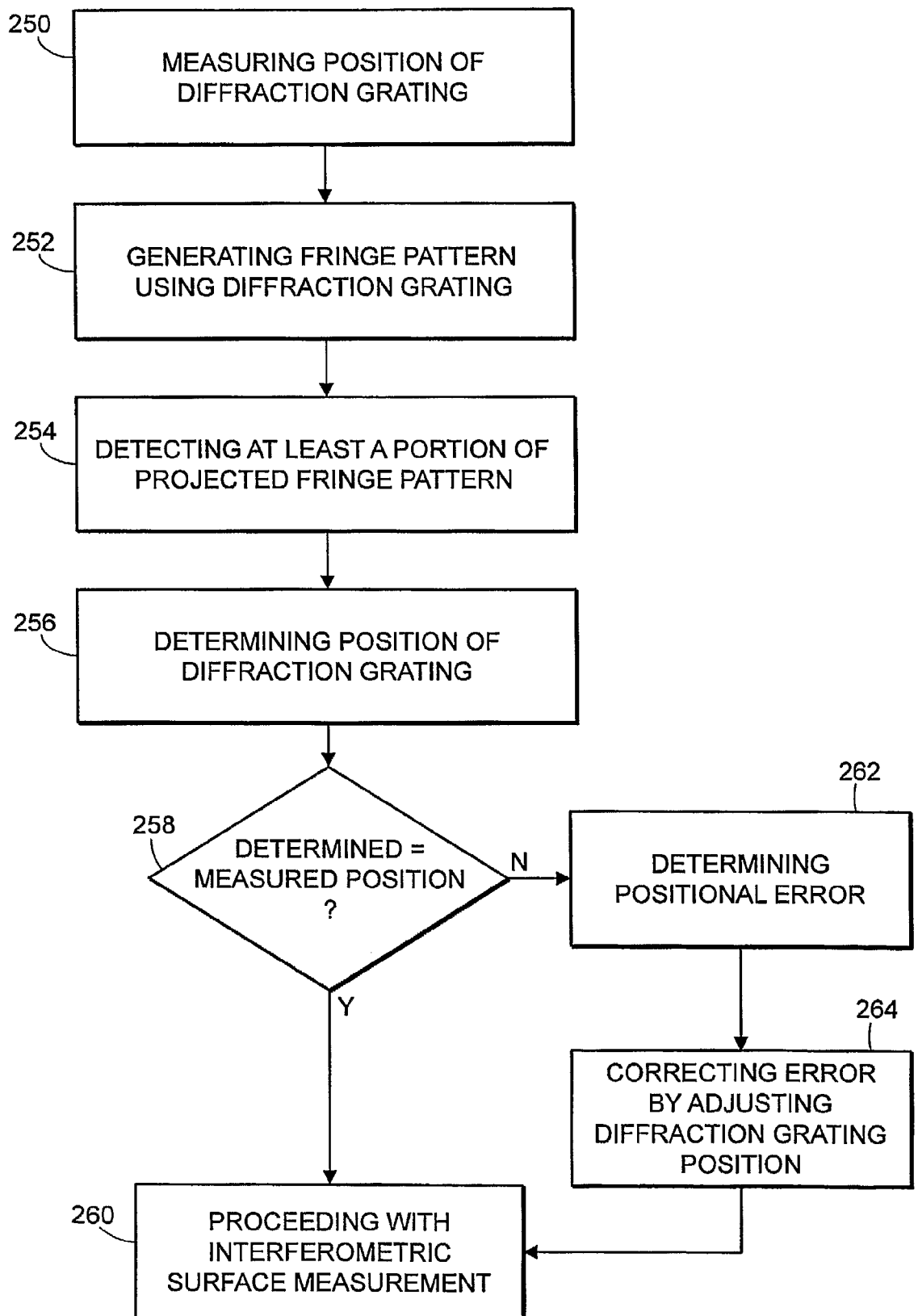
FIG. 14 is a flow diagram of a process for detecting unwanted movement of a diffraction grating of an interferometric projection system in accordance with the principles of the invention.

FIG. 14 is a flow diagram of a process for detecting unwanted movement of a diffraction grating in an interferometer projector in accordance with the principles of the invention. The position of a diffraction grating in the projector is measured (step 250) with a position sensor (e.g., capacitive probe). A projected fringe pattern is generated (step 252) by an overlap of an order pair of diffracted beams from the diffraction grating. At least a portion of the projected fringe pattern is detected (step 254). For example, an imager detects the image of the fringe pattern of a dedicated interferometer channel and generates corresponding image data, which is forwarded to the processor 30 to determine (step 256) a position of the diffraction grating or a phase offset of the fringe pattern.

If the determined position of the diffraction grating is within an acceptable tolerance of the measured position (step 258), the interferometric surface measurement system proceeds (step 260) with a measurement using one or more other interferometer channels as described above. However, if the determined position of the fringe pattern is not within the acceptable tolerance (step 258), the processor determines (step 262) a positional error. For example, the processor determines a positional error as the difference between the determined position and the measured position. The determined error can be used to correct (step 264) for the positional error by adjusting the position of the diffraction grating before proceeding (step 260) with the measurement using at least one other channel. Optionally, the determined error can be used in calculations to generate surface contour data for an object surface without requiring adjustment of the position of the diffraction grating.

In some embodiments, the imager is positioned in a fixed relationship to the projector to ensure that any measurements are accomplished with stability and accuracy. If the imager is an active device such as CCD array, heat generated by the active device can cause thermal distortion within the interferometer channel, or within the imager itself, leading to measurement inaccuracies. In some embodiments, thermal distortion is reduced or eliminated through the use of a spatial attenuator and optical detector as described in more detail below.

Figure 15:
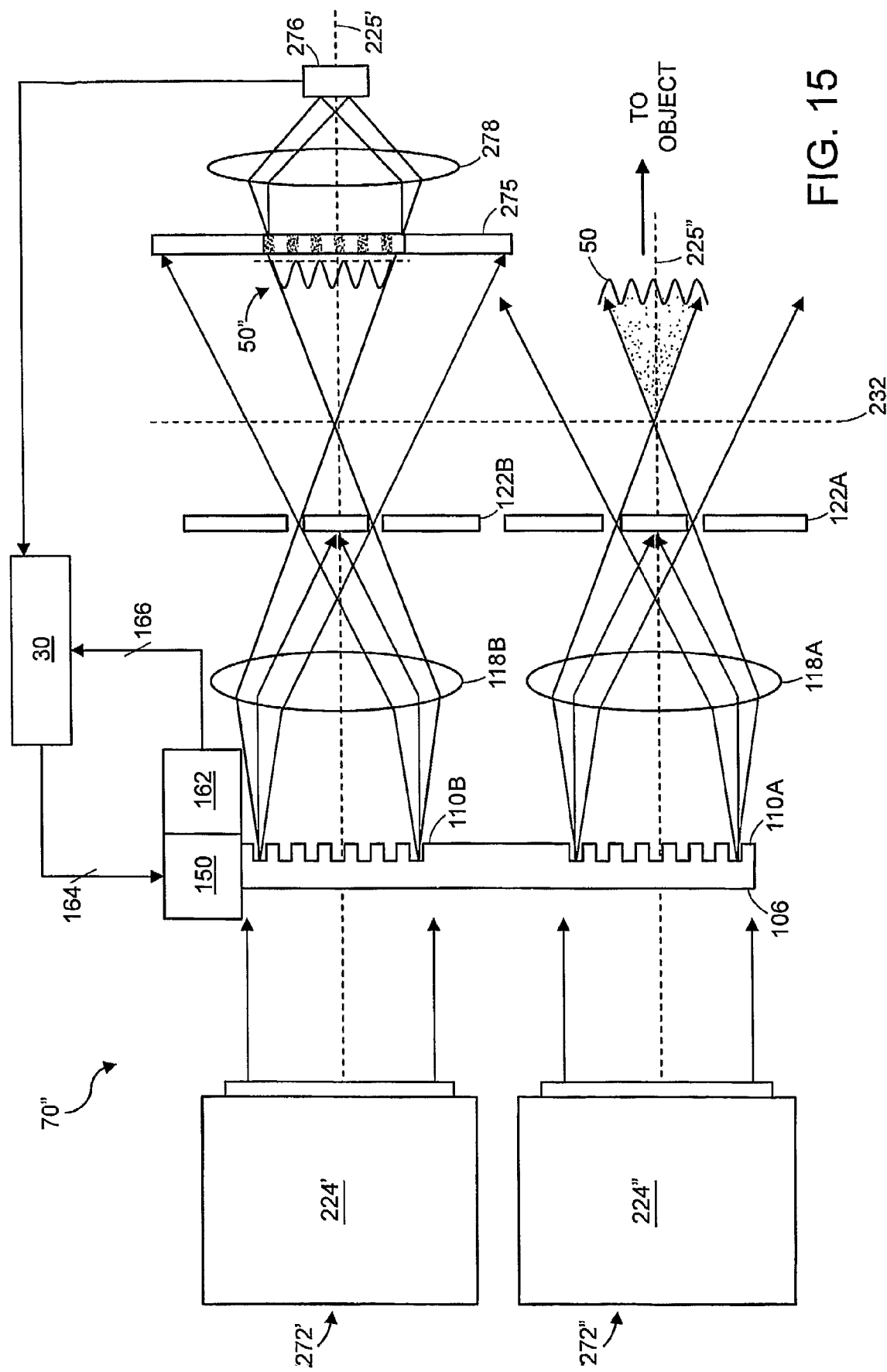
FIG. 15 is a schematic diagram of an alternative embodiment of a multi-channel interferometric projection system in which an imager samples a spatially attenuated structured light pattern of one of the channels.

FIG. 15 is a schematic diagram of an alternative embodiment of a multi-channel interferometer projector 70". The projector 70" is similar to the multi-channel projector 70' of FIG. 13 except that the imager 234 is replaced by a spatial attenuator 275 and a detector 276. A light collecting lens 278 between the spatial attenuator 275 and detector 276 focuses the fringe pattern 50" after spatial attenuation onto the detector 276. The detector 276 is also in communication with a processor 30. In a preferred embodiment, the spatial attenuator 275 includes an optical mask 275 that is rigidly coupled to the projector 70" at a known location, preferably close to the spatial filter 122B to minimize size, but beyond the fringe boundary 232.

The optical mask 275 can include an optically transmissive substrate (e.g., glass) coated with optically absorbing or reflecting regions. These optically absorbing or reflecting regions form a pattern that matches or approximates the fringe pattern 50". For example, when the fringe pattern 50" is properly aligned with an optically absorbing or "blocking region," the intensity peaks of the fringe pattern 50" are masked by the blocking regions such that substantially no light is transmitted through the optical mask 275. In this instance, the detector 276 detects a null value. In an alternative embodiment, the blocking regions are designed to correspond to the troughs of the fringe pattern 50" so that a maximum intensity (i.e., a peak) is detected for proper alignment. Detecting anything other than a peak (or a null) indicates an error in the position of the diffraction grating 110B.

Figure 16:
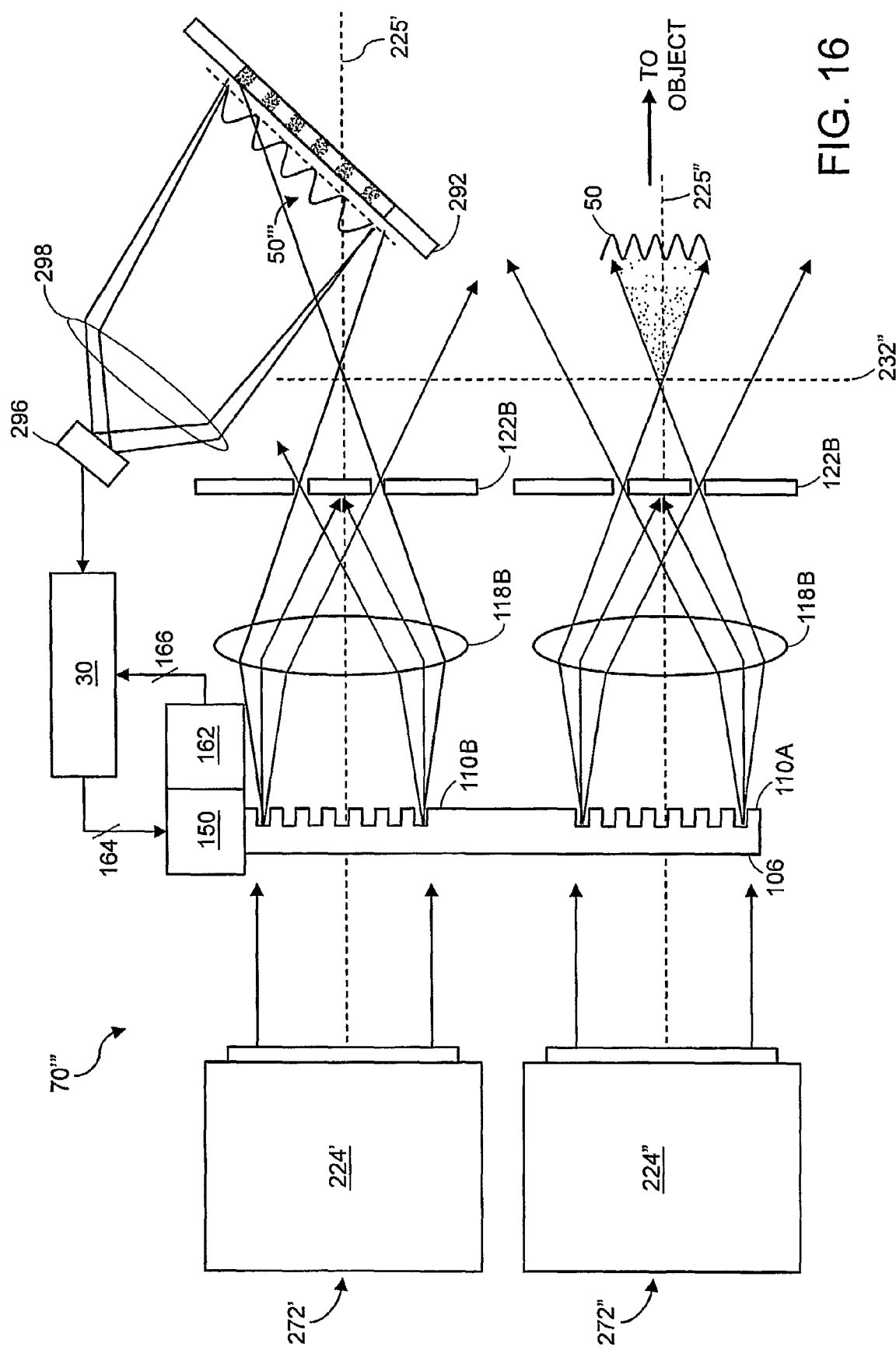
FIG. 16 is a schematic diagram of an alternative embodiment of a multi-channel interferometric projection system in which an imager samples a reflected, spatially attenuated structured light pattern of one of the channels.

FIG. 16 is a schematic diagram of another alternative embodiment of a multi-channel interferometer projector 70'''. The projector 70''' is similar to the multi-channel projector 70" of FIG. 15, except that the transmissive spatial attenuator 275 is replaced by a reflective spatial attenuator 292. A light collecting lens 298 between the spatial attenuator 292 and detector 296 focuses the fringe pattern 50''' after spatial attenuation onto the detector 296. The detector 296 is also in communication with a processor 30. In a preferred embodiment, the reflective spatial attenuator 292 includes an optically reflective mask 292 that is rigidly coupled to the projector 70''' at a known location, preferably close to the spatial filter 122B to minimize size, but beyond the fringe boundary 232".

The reflective mask 292 includes an optically reflective substrate (e.g., mirrored glass). In one embodiment, a mirrored substrate is coated with optically absorbing or blocking regions, leaving reflecting regions exposed. In another embodiment, a non-reflective substrate is coated with reflective regions. In either embodiment, these reflective regions form a pattern that matches or approximates the fringe pattern 50'''. When properly aligned, the intensity peaks of the fringe pattern 50''' are aligned with the reflective regions such that a maximum intensity of light is reflected by the spatial attenuator 292 and the detector detects a peak intensity. In an alternative embodiment, the reflecting regions are designed to correspond to the troughs of the fringe pattern 50''' so that a minimum intensity (or null) is detected for proper alignment. Again, detecting anything other than a null (or a peak) indicates an error in the position of the diffraction grating 110B.

Reflective masks 292 are generally angled with respect to the optical axis 225', such that reflections are directed off-axis. This allows the detector 296 and other processing devices, such as a collecting lens 298 to be positioned off-axis so as not to interfere with the projected fringe pattern 50'''.

With either of the embodiments of FIG. 15 and FIG. 16, the processor 30 receives the detector output and determines any error in the position of the diffraction grating 110B. The processor 30 commands the positioning stage 150 to reposition the diffraction grating 110B in response to the determined error. The detector output is monitored, and the position of the diffraction grating 110B is again adjusted until the error is reduced to an acceptable value, or eliminated indicating proper position. Subsequently, the processor 30 uses positional information provided by the position sensor 162 to determine any positional error. The detector output is occasionally or periodically monitored to determine any error in the feedback signal from the position sensor 162.

In some embodiments, one channel of the four-channel interferometer projector 70', 70", 70''' (generally 70) is dedicated to implement an optical sensing technique for assessing one or more of the position, rotation and scale of projected fringe patterns irradiating the surface of an object of interest. Thus, only three of the four interferometer channels of the interferometer projector 70 are used for actual surface contour measurements.

It should be appreciated, however, that optical sensing techniques according to the present disclosure are not limited in this respect, and that the concepts discussed below in connection with optical sensing techniques may be employed in a variety of different projector configurations according to the present disclosure. For example, in another implementation, the four channel interferometer projectors 70 discussed above may be modified to include a fifth dedicated optical sensing channel (e.g., positioned centrally with respect to the four "measurement" channels.) In yet other embodiments, a portion of a fringe pattern generated by one or more channels may be diverted in the projector from the projection path toward the surface being measured (e.g., using a mirror with an appropriately sized aperture), without significantly affecting the fringe pattern as it irradiates the surface. In this manner, the diverted portion of the generated fringe pattern may be used in optical sensing techniques as discussed below.

Figure 17:
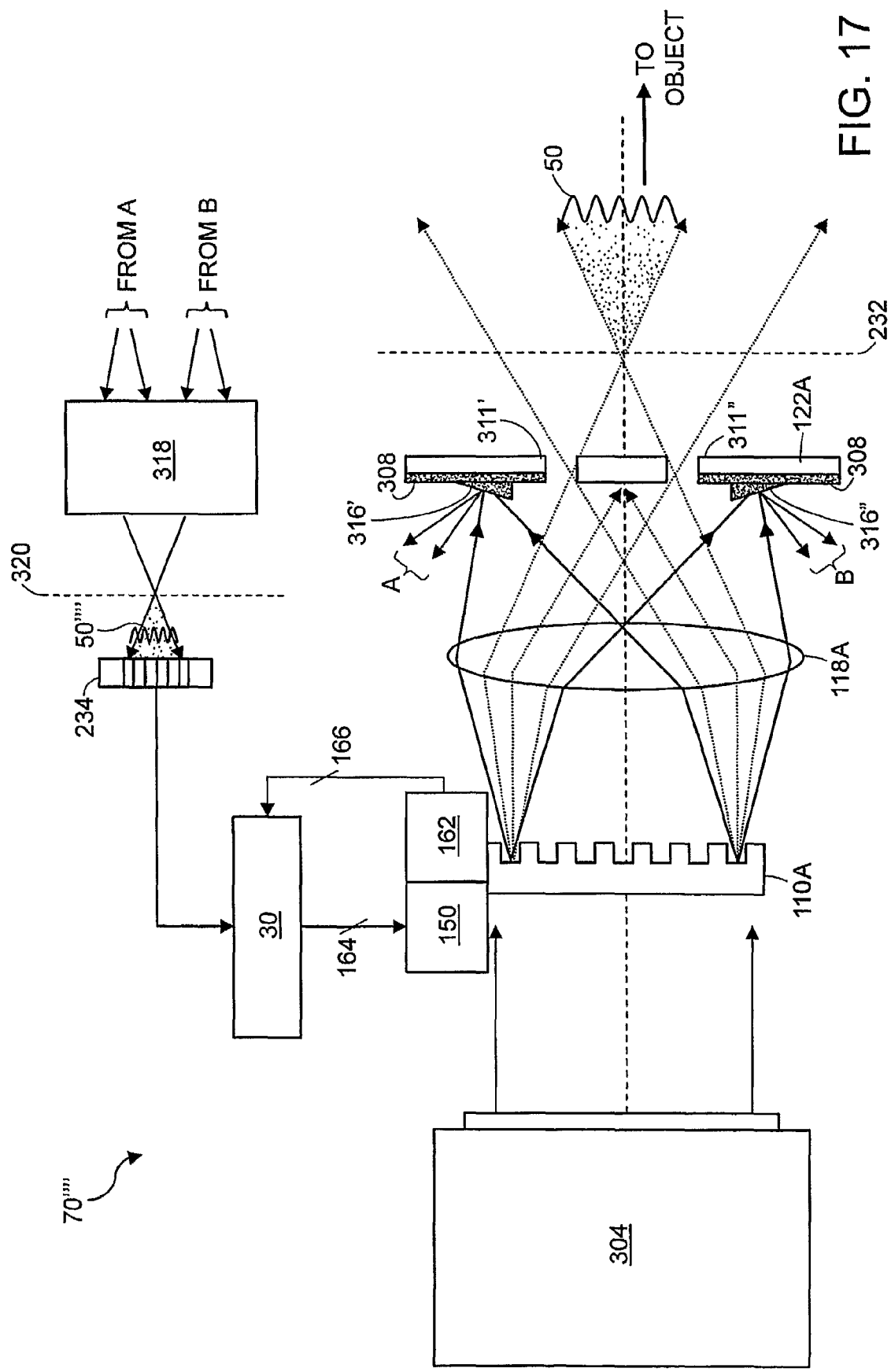
FIG. 17 is a schematic diagram of an embodiment of an interferometric projection system for irradiating a surface of an object with a structured light pattern produced by a pair of diffracted beams, including an imager sampling a structured light pattern produced by a different pair of diffracted beams.

FIG. 17 is a schematic diagram of an embodiment of one channel of a multi-channel interferometer projector 70'''', in which a portion of a fringe pattern is diverted for fringe position measurements, while a non-diverted portion of the fringe pattern irradiates the object. The projector 70'''' is similar to the multi-channel projector 70' of FIG. 13, with a reflective coating applied to a surface 308 of a spatial filter 122A and an optical network 318 for routing the reflected light from the spatial filter 122A to the imager 234.

Various ordered pairs of diffracted beams (e.g., the first order pair of diffracted beams and higher-order pairs of diffracted beams) are produced by the diffraction grating 110A. One or more of these higher-order pairs of diffracted beams are also focused through focusing objective lens 118A onto a surface 308 of the spatial filter 122A. The spatial filter 122A includes a pair of pinhole apertures 311', 311" aligned with the focused first order pair of diffracted beams. One or more of the higher-order ordered pairs of diffracted beams focused onto the reflective surface 308 of the spatial filter 122A are reflected and directed by an optical network 318 to an off-axis location. The optical network 318 includes standard optical routing techniques (e.g., mirrors) producing a higher-order fringe pattern 50'''' in a region of beam overlap beyond a fringe boundary 320. The imager 234 is positioned in the region of beam overlap.

The reflective coating 308 is applied to the surface of the spatial filter 122A at least in the vicinity of the second-order, ordered pair of diffracted beams. To facilitate optical routing of the reflected ordered pair of diffracted beams, the surface 308 can include angled reflective surfaces 214', 214" to selectively reflect the pair of second-order diffracted beams off-axis and toward the optical network 318.

By using pairs of higher-order diffracted beams, a dedicated image-tracking channel is created without interfering with the first-order diffraction beams used to illuminate the object surface. Using the higher-order pairs of diffracted beams does not introduce any optical loss to the first order beams. At least one benefit of this approach is its applicability for use in single channel interferometer projectors.

Additionally, the higher-order fringe patterns produced by the pair of higher-order diffracted beams can have a higher spatial frequency than the fringe patterns realized by interference of the first order beams. The increased spatial frequency can provide improved positional sensitivity compared to first-order systems.

Figure 18:
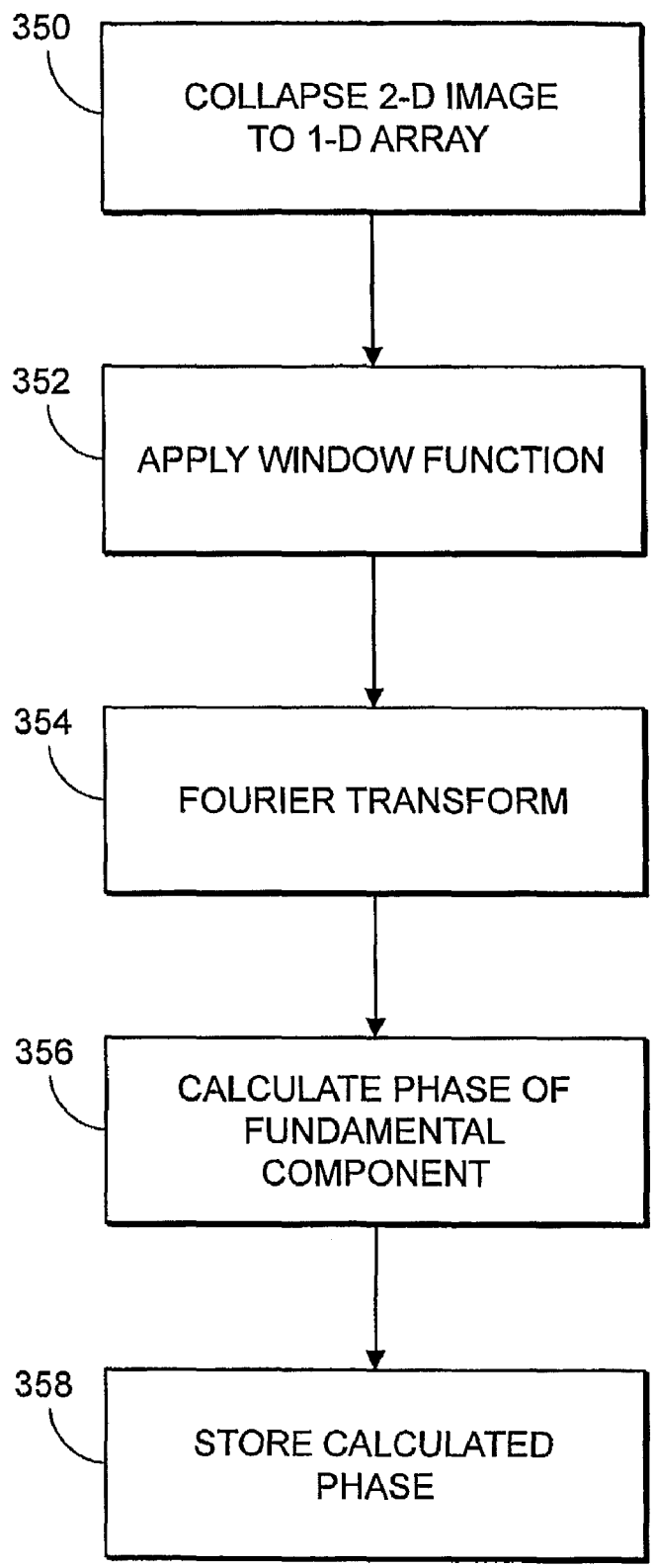
FIG. 18 is a flow diagram of a process for determining a phase of an image received by any of the embodiments of FIG. 15, FIG. 16, and FIG. 17.

The processing of image data to detect changes in fringe pattern position (e.g., translation), according to one embodiment of an optical sensing technique, is explained with the aid of FIG. 3 and the flow diagram of FIG. 18. For purposes of illustration in connection with the following discussion, the portion of the image shown in FIG. 3 is taken to be that obtained by the CCD array of the 234 (FIG. 13) irradiated by the fringe pattern 50' of the dedicated channel 222'. The x-axis and y-axis of the coordinate system 38 correspond to the CCD array of the imager 234 (FIG. 13) rather than the imaging plane of the camera 22 (FIG. 1). Recall that, in one exemplary implementation utilizing a conventional VGA chip, the imager 234 includes 640 pixels along its x-axis and 480 pixels along its y-axis.

With reference to FIG. 18, the two-dimensional image of the fringe pattern is "collapsed" (step 350) along the y-axis (e.g., an average intensity value along the y-axis is taken) to yield a one-dimensional array (or vector), indicating average intensity along the x-axis. In essence, this vector represents the periodic intensity function corresponding to the fringe pattern (e.g., see FIG. 2). This vector is multiplied (step 352) by a "window" function (e.g., a "Hann" window, or a "Hamming" window) to appropriately truncate the vector at both ends, in preparation for performing a Fourier transform (step 354). The Fourier transform transforms the truncated vector to the frequency domain. The phase of the fundamental component of the Fourier transform is calculated (step 356) as a reference representing the position of the fringe pattern in the image. Once calculated, the phase value may be stored (step 358). Based on one exemplary implantation of the measurement and processing method outlined herein, the fringe pattern position may be measured to within 30 nanometers of similar measurements made using the capacitive probe shown in the position sensor 162 of FIG. 8B.

While a frequency domain analysis provided the basis for image processing in the method of FIG. 18, it should be appreciated that other analysis methods can be employed to assess one or more of fringe pattern position, rotation and scale according to other embodiments of the present disclosure. For example, based on the one-dimensional array obtained in step 350 of FIG. 18, one or both of zero crossings (troughs) or peaks of an intensity vector may be analyzed in multiple images and compared to assess position and/or scale of a fringe pattern.

Figure 19:
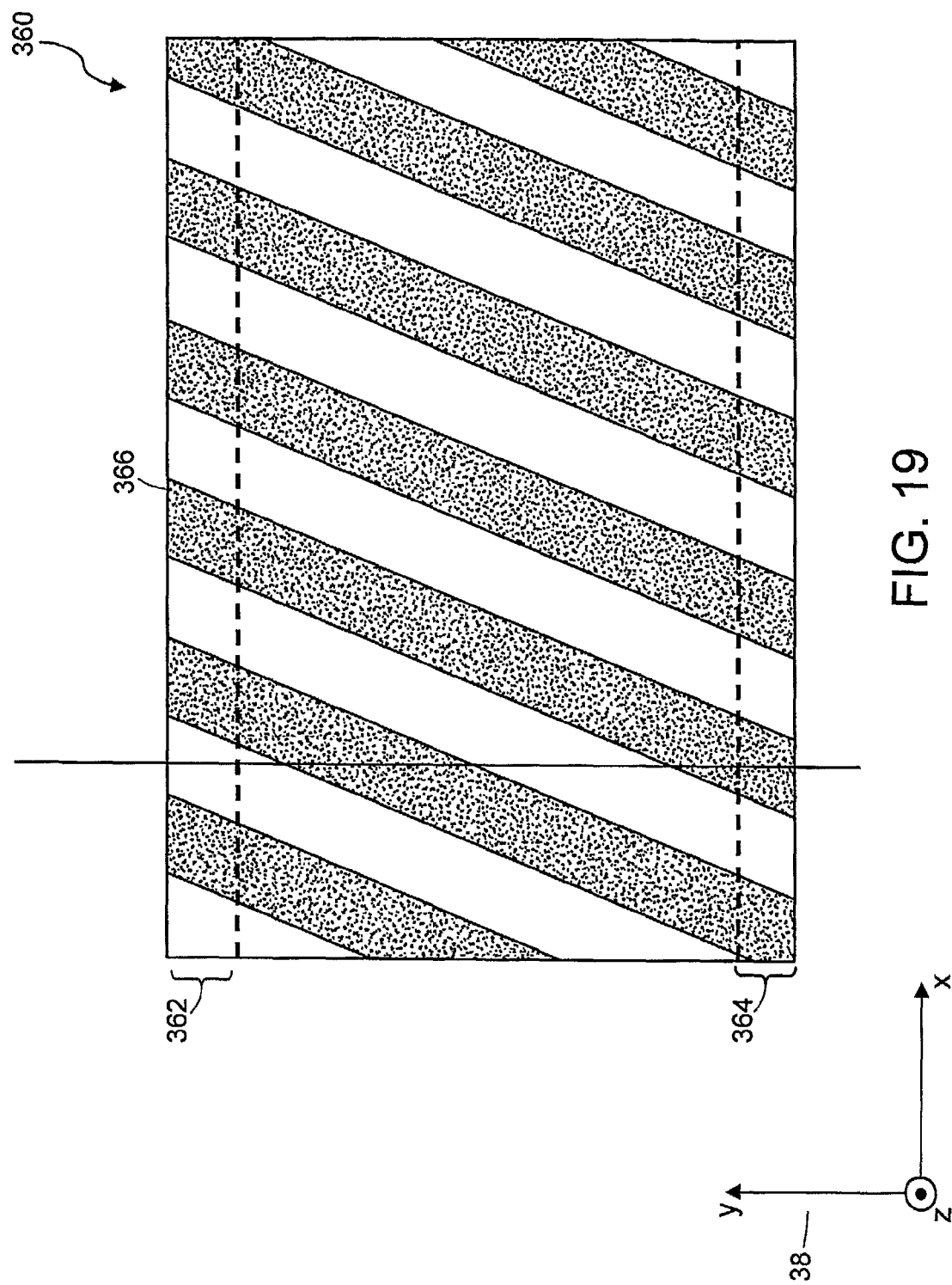
FIG. 19 is schematic diagram illustrating an image acquired by an imager of an interferometric projection system according to any of the embodiments of FIG. 15, FIG. 16, and FIG. 17, in which rotation of a fringe pattern is evident.

With respect to measurement of rotation, FIG. 19 illustrates an image 360 acquired by the imager 234 (FIG. 13), in which rotation of a fringe pattern is evident (e.g., the vertical pattern of FIG. 3 appears to be slanted). According to one embodiment, such rotation may be assessed by monitoring one or more rows 362 a the top of the images and one or more rows 364 at the bottom of the images, via frequency domain analysis, analysis of troughs or peaks, or other methods to address changes over time that reflect opposite shifts in position between fringes 366 at the top of the images and the same fringes 366 at the bottom of the images.

In other embodiments related to the optical sensing techniques discussed above, alternative grating types are employed in a projector channel dedicated to optical sensing so as to produce fringe patterns other than essentially vertical lines. Such alternative fringe patterns can facilitate an extension of the range and types of measurements that may be made via optical sensing techniques. For example, in various embodiments, a grating with multiple spatial frequencies, or a multi-segment grating, is employed to create two or more different fringe patterns within the field of view of the optical imager 234 (FIG. 13). In other embodiments, gratings can be employed that generate fringe patterns having some variation along a y-axis of the field of view of the optical imager 234 (e.g., angled, or curved fringes), to facilitate measurement of position changes that involve some movement along the y-axis.

In yet other embodiments, rather than employing a two-dimensional imager 234 as discussed above, a relatively simpler one-dimensional sensor (e.g., a diode array) is employed as an optical sensor. With reference again to FIG. 18, recall that in step 350, a two-dimensional image of a fringe pattern was collapsed into a one-dimensional array for further analysis. A similar process can be accomplished optically. For example, according to one embodiment, radiation exiting the spatial filter of a channel dedicated to optical sensing is focused by an objective (e.g., a cylindrical lens) to form an essentially one-dimensional radiation pattern orthogonal to the direction of radiation propagation. This is essentially equivalent to collapsing the fringe pattern along a vertical or y-axis to form a one-dimensional pattern along a horizontal or x-axis. This "collapsed" pattern can be focused onto a one-dimensional imager to obtain the imaged data. According to various aspects of this embodiment, a one-dimensional imager generally takes up less space than a two-dimensional sensor, typically dissipates less heat, and also takes less time to scan in acquiring images of collapsed fringe patterns. Subsequently, the acquired images of collapsed fringe patterns can be processed according to the method outlined in FIG. 18, or other methods (e.g., trough or peak analysis).

While the invention has been shown and described with reference to specific embodiments, it should be understood by those skilled in the art that various changes in form and detail may be made therein without departing from the spirit and scope of the invention.

What is claimed is:

1. A multiple channel interferometer projector for projecting fringes onto a surface of an object, comprising:
    a plurality of interferometer channels each having a spatially separate optical axis, at least one of the interferometer channels configured to project a respective fringe pattern onto the surface of an object;
    a plurality of diffraction gratings each disposed along a respective one of the spatially separate optical axes;
    a positioning stage coupled to the diffraction gratings and configured for positioning the plurality of diffraction gratings in a plane perpendicular to the optical axis;
    an imager substantially fixed in position relative to the diffraction gratings, the imager receiving at least a portion of one of the projected fringe patterns and generating image data responsive thereto; and
    a processor in communication with the imager and the positioning stage, the processor receiving the image data and determining a position of the diffraction gratings, wherein the positioning stage adjusts the position of the diffraction gratings in response to a difference between the determined position and a measured position.

2. The multiple channel interferometer projector of claim 1, wherein the plurality of diffraction gratings are disposed on a common platform.

3. The multiple channel interferometer projector of claim 2, wherein the plurality of diffraction gratings are on a common substrate.

4. The multiple channel interferometer projector of claim 1, wherein the imager comprises a charge coupled device (CCD) array.

5. The multiple channel interferometer projector of claim 1, wherein the imager comprises a linear detector array.

6. A multiple channel interferometer projector for projecting fringes onto a surface of an object, comprising:
    a plurality of interferometer channels each having a spatially separate optical axis, at least one of the interferometer channels configured to project a respective fringe pattern onto the surface of an object;
    a spatial attenuator disposed on one of the spatially separate optical axes to attenuate the respective projected fringe pattern;
    a detector receiving at least a portion of the attenuated fringe pattern and generating image data responsive thereto; and
    a processor in communication with the detector to receive the image data and, in response thereto, to determine a positional error of an optical component in at least one of the interferometer channels.

7. The multiple channel interferometer projector of claim 6, further comprising adjusting a position of the optical component in response to the determination of the positional error.

8. The multiple channel interferometer projector of claim 6, wherein the spatial attenuator is optically transmissive.

9. The multiple channel interferometer projector of claim 6, wherein the spatial attenuator is reflective.

10. The multiple channel interferometer projector of claim 6, further comprising a lens to focus the respective attenuated fringe pattern onto the detector.

11. A method for determining a positional error of a diffraction grating, comprising:
    measuring a position of a diffraction grating;
    generating a fringe pattern using the diffraction grating;
    detecting at least a portion of the generated fringe pattern;
    determining from the detected fringe pattern, a position of the diffraction grating; and
    comparing the determined position to the measured position, the comparison indicating a positional error.

12. The method of claim 11, further comprising adjusting the position of the diffraction grating in response to the comparison.

13. The method of claim 11, wherein the detecting step comprises detecting the at least a portion of the generated fringe pattern using a charge coupled device (CCD) array.

14. The method of claim 13, wherein the determining step comprises processing image data generated by the CCD array to determine the position of the diffraction grating.

15. The method of claim 11, further comprising spatially attenuating at least a portion of the projected fringe pattern, and wherein the detecting step comprises detecting the spatially attenuated fringe pattern.

16. An interferometer projector for projecting fringes onto a surface of an object, comprising:
    an interferometer channel having an optical axis and configured to project a fringe pattern onto the surface of an object, the interferometer channel including a diffraction grating disposed along the optical axis;
    a positioning stage coupled to the diffraction grating for positioning of the diffraction grating in a plane perpendicular to the optical axis;
    an imager for collecting at least a portion of the projected fringe pattern and generating image data responsive thereto, the imager being substantially fixed in position relative to the diffraction grating;

a spatial filter to select a pair of ordered diffracted beams to the imager; and a processor in communication with the imager and the positioning stage, the processor receiving the image data and, in response thereto, determining a positional error of the diffraction grating, the positioning stage adjusting the position of the diffraction grating in response to the determined positional error.

17. The interferometer projector of claim 16, wherein the spatial filter comprises a reflective surface to direct the pair of ordered diffracted beams to the imager.

* * * * *